US 6,666,105 B2

(12) United States Patent
Wachi

(10) Patent No.: US 6,666,105 B2
(45) Date of Patent: Dec. 23, 2003

(54) BRAKE PEDAL APPARATUS

(75) Inventor: Yuji Wachi, Higashimatsuyama (JP)

(73) Assignee: Bosch Braking Systems Co., Ltd., Tokyo (JP)

( * ) Notice: Subject to any disclaimer, the term of this patent is extended or adjusted under 35 U.S.C. 154(b) by 0 days.

(21) Appl. No.: 10/101,771

(22) Filed: Mar. 21, 2002

(65) Prior Publication Data

US 2002/0134190 A1 Sep. 26, 2002

(30) Foreign Application Priority Data

Mar. 21, 2001 (JP) ........................................ 2001-080997
Mar. 1, 2002 (JP) ........................................ 2002-055939

(51) Int. Cl.[7] ................................................ G05G 1/14
(52) U.S. Cl. .......................................... 74/512; 74/560
(58) Field of Search ........................... 74/560, 512–514, 74/527, 531, 532, 529

(56) References Cited

U.S. PATENT DOCUMENTS

| | | | | | |
|---|---|---|---|---|---|
| 3,766,802 | A | * | 10/1973 | Shellhause | 74/512 |
| 4,386,537 | A | * | 6/1983 | Lewis | 74/512 |
| 4,584,899 | A | * | 4/1986 | Old et al. | 74/532 |
| 4,934,210 | A | * | 6/1990 | Suzuki | 74/512 |
| 5,086,663 | A | * | 2/1992 | Asano et al. | 74/512 |
| 5,293,976 | A | * | 3/1994 | Naruse | 192/1.57 |
| 6,041,674 | A | | 3/2000 | Kato | |
| 6,070,488 | A | * | 6/2000 | Yabusaki et al. | 74/512 |
| 6,076,422 | A | * | 6/2000 | Tabata | 74/512 |
| 6,289,762 | B1 | * | 9/2001 | Silva | 74/513 |
| 2002/0038577 | A1 | * | 4/2002 | Bialk et al. | 74/512 |
| 2002/0088303 | A1 | * | 7/2002 | Hayashihara et al. | 74/560 |

FOREIGN PATENT DOCUMENTS

| | | | | |
|---|---|---|---|---|
| DE | 198 36 691 | | 3/2000 | |
| EP | 0 879 745 | | 11/1998 | |
| GB | 2184524 | A * | 6/1987 | 74/512 |

* cited by examiner

Primary Examiner—Vinh T. Luong
(74) Attorney, Agent, or Firm—Kanesaka & Takeuchi

(57) ABSTRACT

In a brake pedal apparatus, as a brake pedal is depressed when an engaging device and a receiving portion are engaged with each other, a second lever member pivots about a second pivot pin. At this point, when the pedaling force is smaller than a threshold value, the engagement between the engaging device and the receiving portion is maintained so that the second lever member pivots about the second pivot pin. In this state, the pedal leverage is set to be a smeller ratio. As the pedaling force exceeds the threshold, the engaging device is disengaged from the receiving portion. Then, the first and second lever members are coupled by a stopper portion to pivot together about a first pivot pin. Therefore, the pedal leverage is changed to a larger ratio.

12 Claims, 16 Drawing Sheets

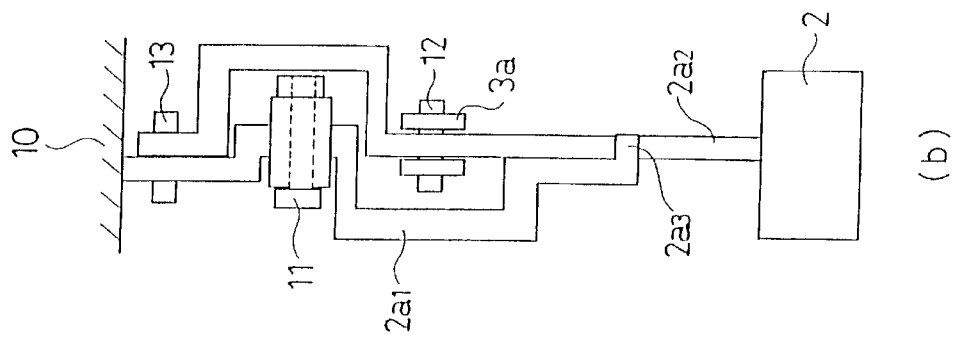
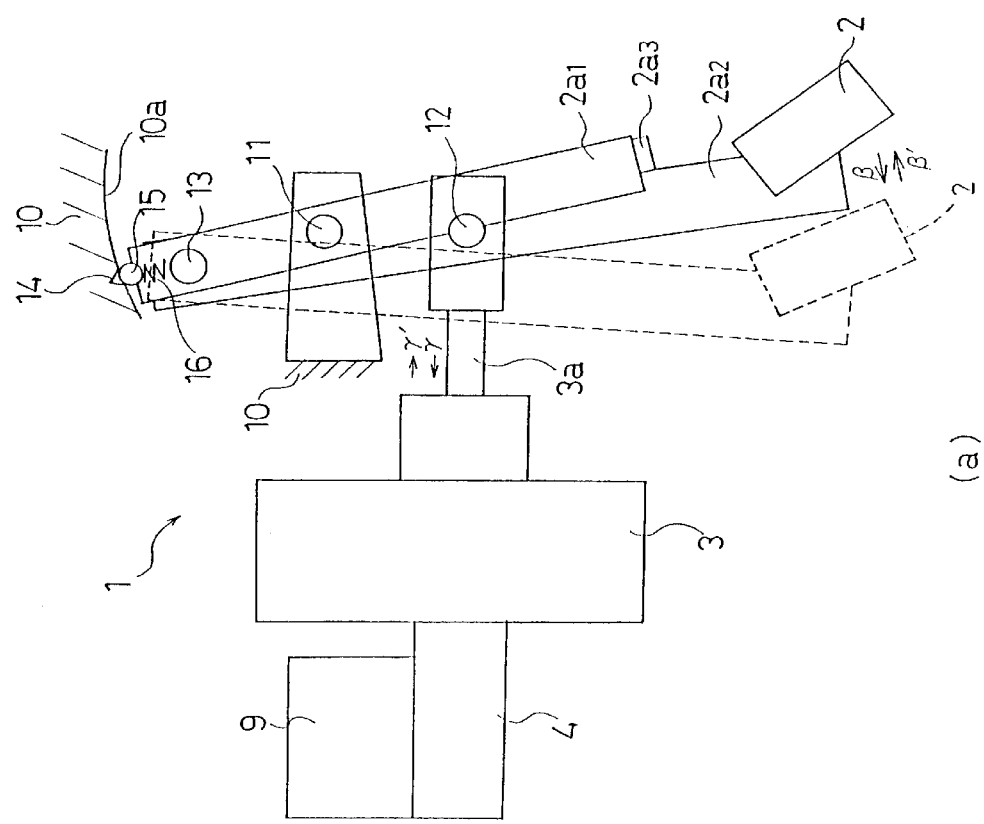
FIG. 1

FIG. 3
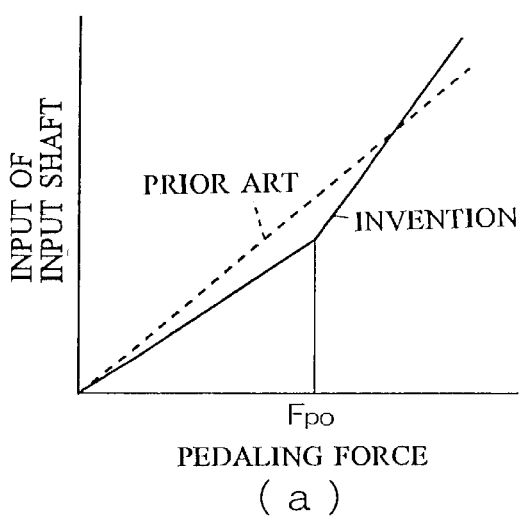
(a)
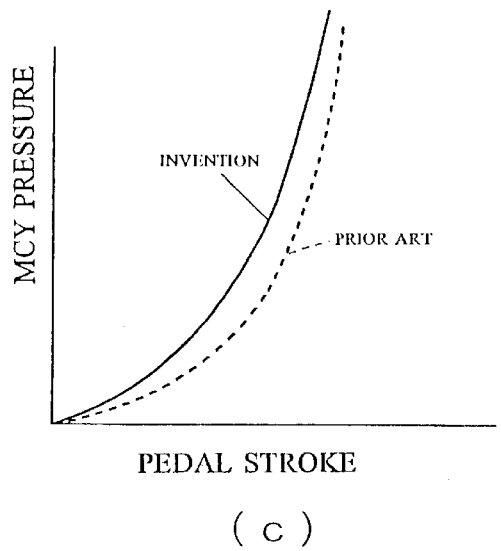
(c)
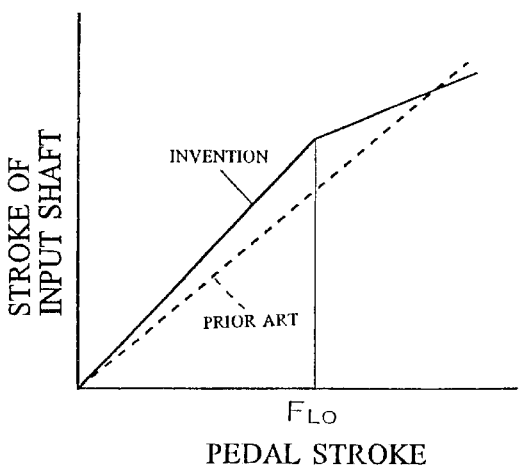
(b)
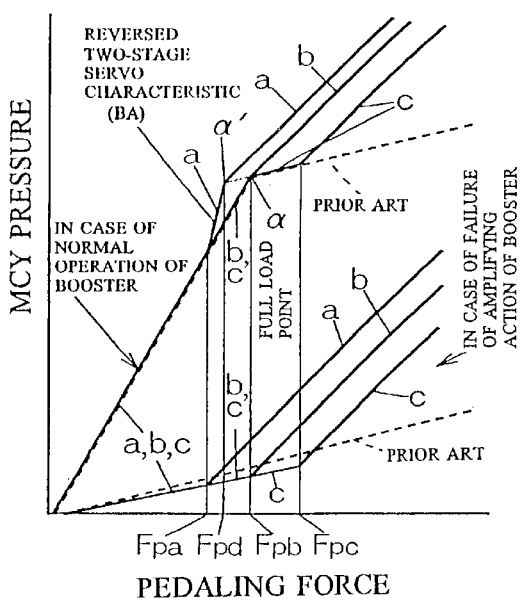
(d)

FIG. 4
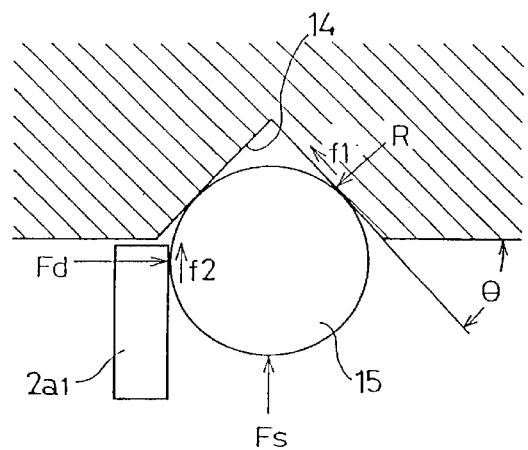
FIG. 5
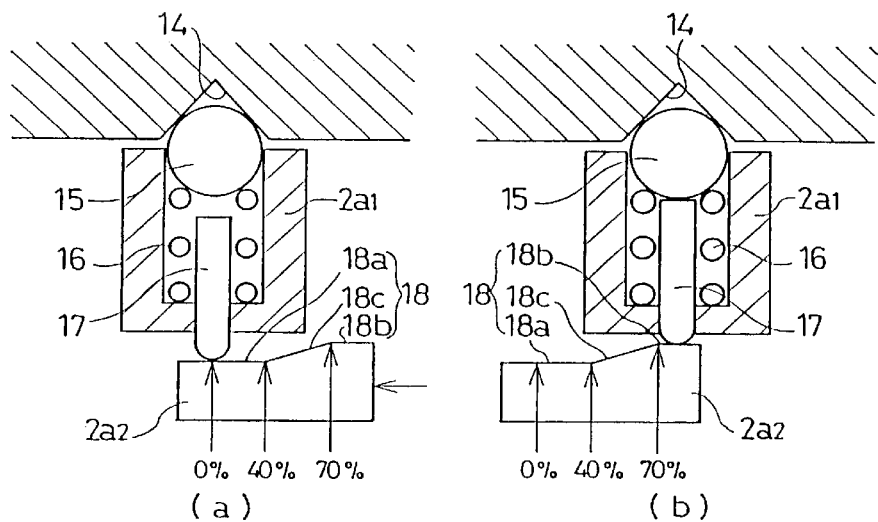
(a)　　　　　　　　　　　(b)
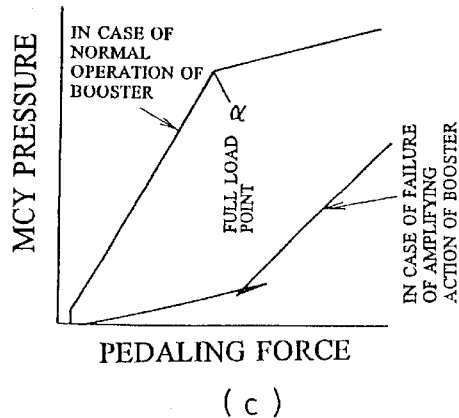
(c)
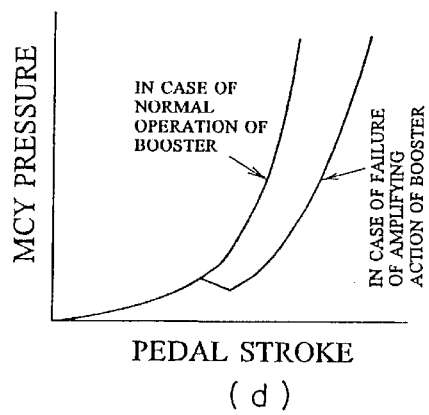
(d)

(a) (b) (c)

FIG. 7
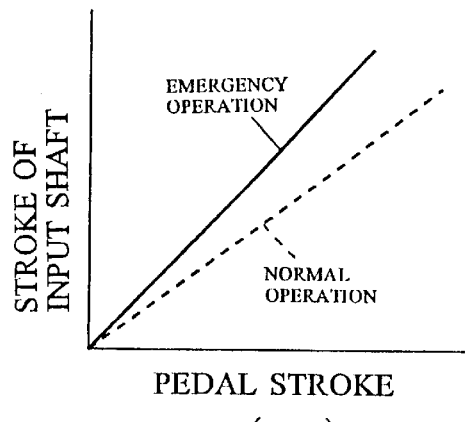
(a)
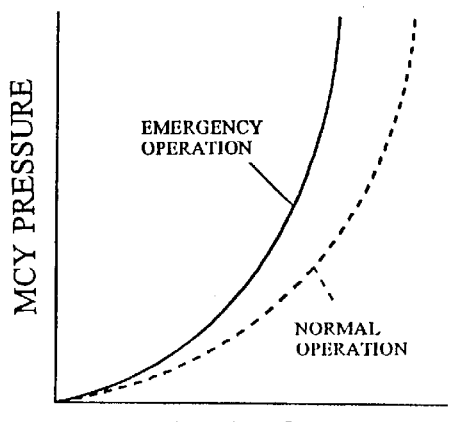
(b)
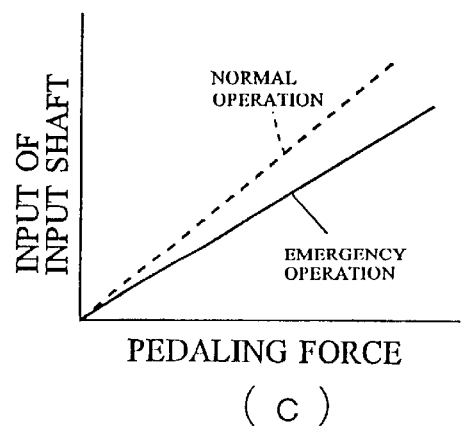
(c)

FIG. 8
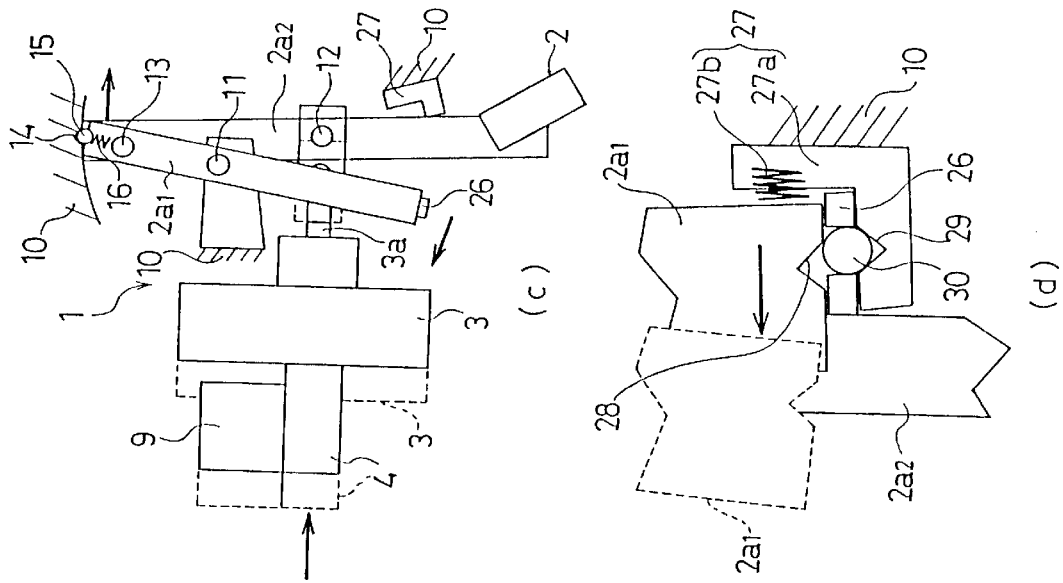
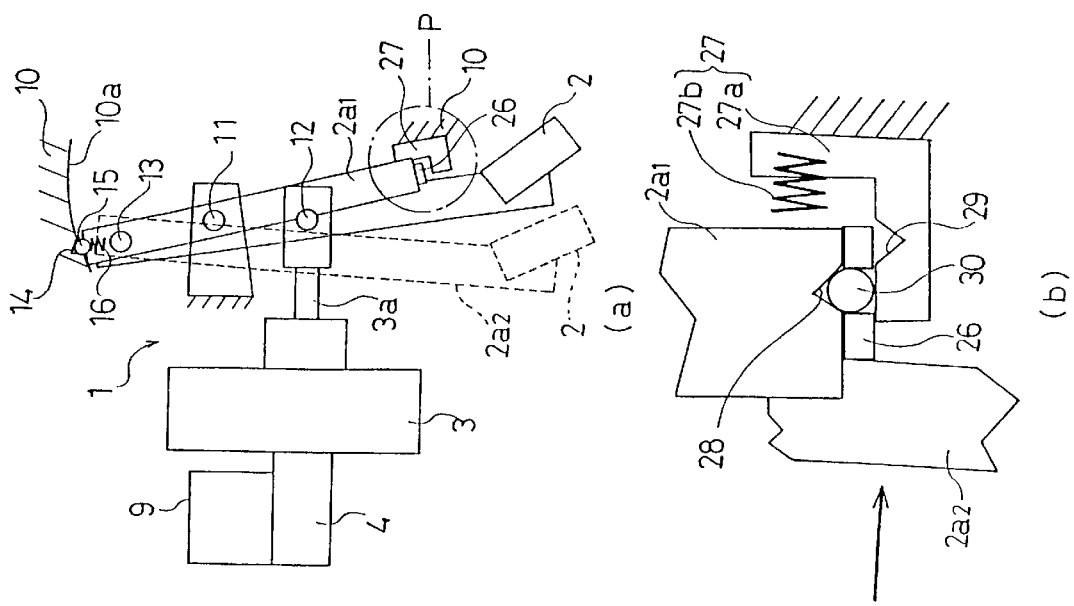

FIG. 9
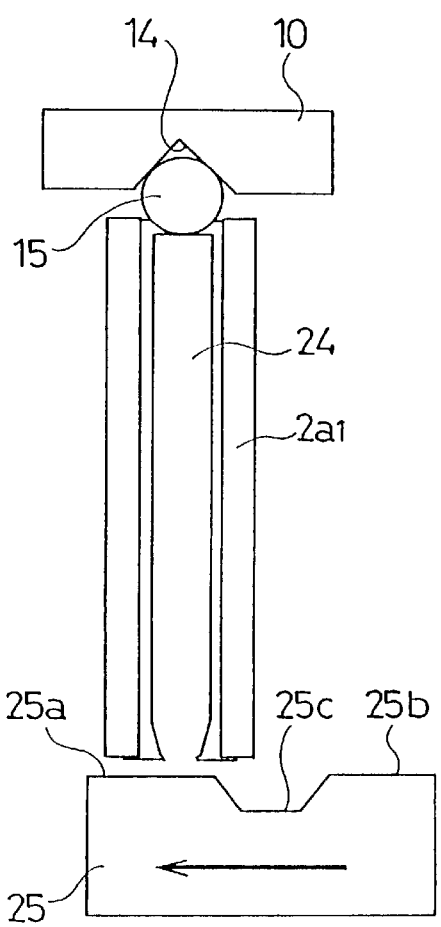
(a)
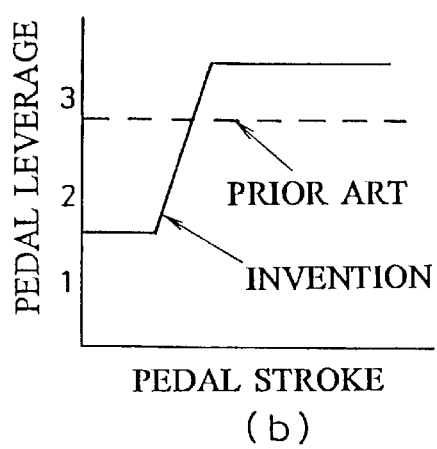
(b)
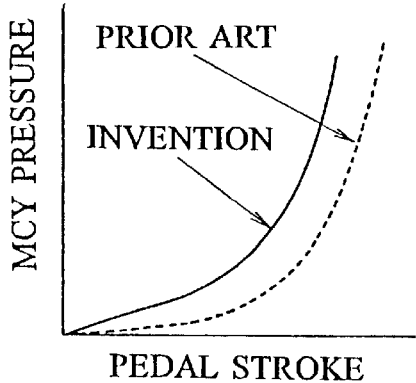
(c)

FIG. 13
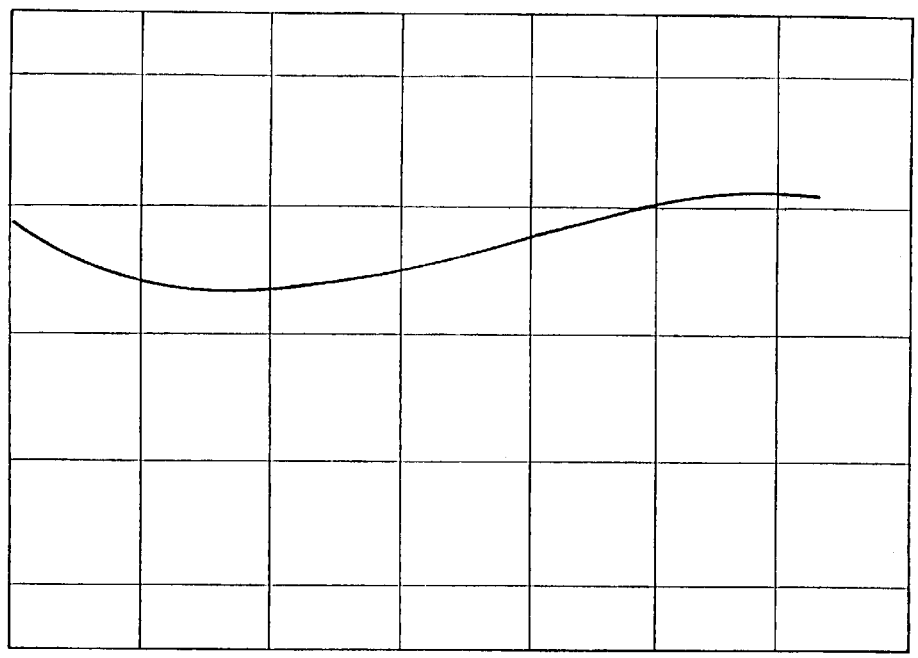
(a)
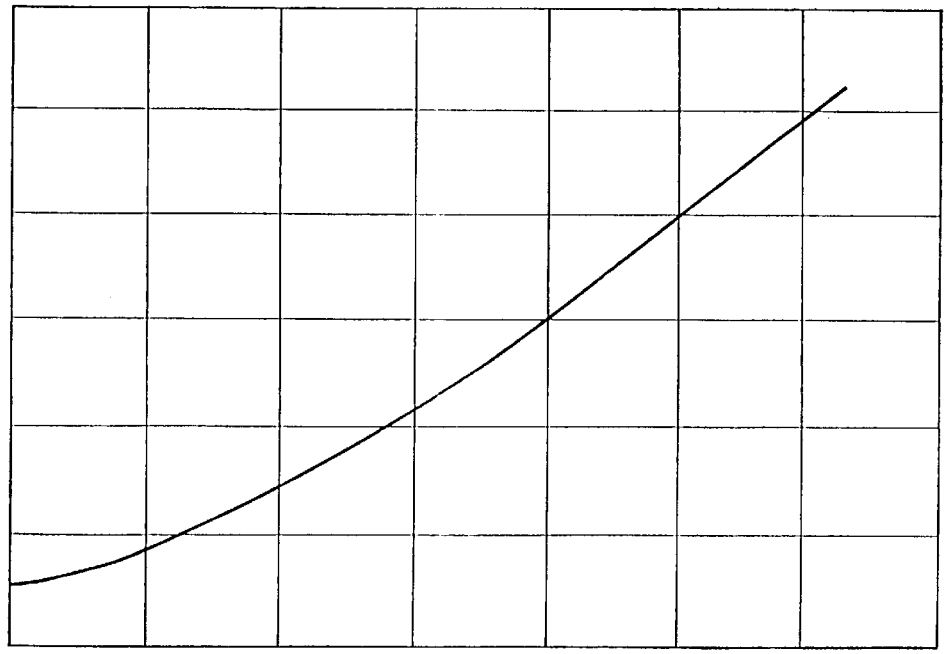
(b)

In the event of failure of the amplifying action

In the normal state

The pedal leverage of this type is flat relative to the pedal storoke.

PEDAL LEVERAGE

PEDAL STROKE (a)　　　　(b)

BRAKE PEDAL APPARATUS

BACKGROUND OF THE INVENTION

The present invention relates to a brake pedal apparatus for inputting an operational force of a driver into a brake system for actuating brakes and, more particularly, to a brake pedal apparatus of which the lever ratio (hereinafter, referred to as "pedal leverage") is changeable.

In most brake systems for automobiles, brakes are actuated by pedaling force applied by depressing a brake pedal.

FIG. 17 is an illustration schematically showing the basic structure of a typical conventional brake system with a brake pedal. In FIG. 17, numeral 1 designates a brake system, 2 designates a brake pedal for brake operation, 3 designates a booster for amplifying the pedaling force on the brake pedal 2 by power such as fluid pressure, negative pressure, or air pressure (positive pressure), 4 designates a tandem-type master cylinder (hereinafter, sometimes referred to as "MCY") which is actuated by the output of the booster 3 to develop master cylinder pressure, 5 and 6 designate wheel cylinders (hereinafter, sometimes referred to as "WCYs") of a first brake circuit which generate braking force by the MCY pressure supplied as braking pressure to them, 7 and 8 designate WCYs of a second brake circuit which generate braking force by the MCY pressure supplied as braking pressure to them, and 9 designates a reservoir of the MCY 4.

In this brake system 1, an input shaft 3a of the booster 3 is advanced (moved to the left in FIG. 17) by depression of the brake pedal 2 and the booster 3 thus amplifies the pedaling force to output amplified power. By the output of the booster 3, the MCY 4 is actuated to develop MCY pressure which is then supplied to the respective wheel cylinders 5, 6, 7, 8, thereby actuating brakes with large braking force i.e. amplified pedaling force.

By the way, in such a brake system 1, the lever ratio (L1+L2)/L1 of a lever 2a of the brake pedal 2, i.e. the pedal leverage, is normally constant, wherein L1 is a distance between a pivot of the lever 2a and a connection point where the input shaft 3a of the booster 3 is connected to the lever 2a, and L2 is a distance between the connection point and the center of the brake pedal 2. The constant pedal leverage leads to the following problems:

(1) in case of failure of amplifying action of the booster 3 (for example, power source failure), required pedaling force should be too large;

(2) under some condition, the pedal stroke may be increased, thus giving the driver a bad pedaling feel;

(3) a driver such as an inexpert driver may not produce large braking force even in case of emergency braking;

(4) the brake pedal may largely shift to the driver during a vehicle collision; and (5) in such a design for improving the fuel consumption rate that brake pads are spaced largely (there is a limitation of spacing because the loss stroke of the brake pedal 2 should be considered) apart from brake disks or brake drums to prevent brake calipers from dragging, the pedal stroke should be longer.

Though there is a conventional pedal apparatus in which the pedal leverage can be adjusted by changing the joint position between the lever 2a of the brake pedal 2 and the input shaft 3a of the booster 3 (or the input shaft of the MCY 4) in case of booster failure, this apparatus can not completely solve the aforementioned problems and, in addition, the operation for changing the joint position is troublesome.

SUMMARY OF THE INVENTION

It is an object of the present invention to provide a brake pedal apparatus capable of easily changing its pedal leverage and therefore solving the aforementioned problems.

To achieve the aforementioned object, a brake pedal apparatus of the present invention comprises: a first lever member of which a middle portion is pivotally supported to a vehicle body by a first pivot pin; a second lever member which is provided at its one end with a pedal member and is pivotally connected to one end of said first lever member by a second pivot pin and to which an input shaft of a booster or an input shaft of a master cylinder is pivotally connected; a pivotal movement control means for controlling said first lever member in such a manner as to prevent the pivotal movement of said first lever member when a predetermined condition is not satisfied and to allow the pivotal movement of said first lever member when the predetermined condition is satisfied; and a coupling means for coupling said first and second lever members to pivot together when the pivotal movement of said first lever member is allowed.

The present invention is also characterized in that an end of said second lever member positioned opposite to said pedal member is pivotally connected to the end of said first lever member positioned opposite to said pedal member, and the input shaft of said booster or the input shaft of said master cylinder is pivotally connected to the second lever member at a position on the pedal member side relative to said first pivot pin.

Further, the present invention is characterized in that a middle portion of said second lever member is pivotally connected to the end of said first lever member positioned at the pedal member side, and the input shaft of said booster or the input shaft of said master cylinder is pivotally connected to the second lever member at a position on the side opposite to said pedal member relative to said first pivot pin.

In addition, the present invention is characterized in that said second lever member and the input shaft of said booster or said master cylinder are pivotally connected via a third lever member.

The present invention is also characterized in that said pivotal movement control means comprises: a receiving portion disposed at a position of said vehicle body which corresponds to the one end of said first lever member; an engaging means disposed on the one end of said first lever member and capable of engaging said receiving portion; and an engagement control means for controlling the engagement between said engaging means and said receiving portion in such a manner as to disengage said engaging means by the satisfaction of said predetermined condition, which engages said receiving portion to prevent the pivotal movement of said first lever member, from said receiving portion to allow the pivotal movement of said first lever member.

The present invention is characterized in that said predetermined condition is whether the pedaling force exceeds a preset threshold value or not, and said engagement control means controls the engagement in such a manner as to maintain said engaging means in the engaged state with said receiving portion when said pedaling force is smaller than the preset threshold value and to disengage said engaging means from said receiving portion when said pedaling force exceeds said preset threshold value.

Furthermore, the present invention is characterized in that said predetermined condition is whether the pedaling force exceeds a first preset threshold value or not and whether the pedal stroke exceeds a second preset threshold value or not, and said engagement control means controls the engagement in such a manner as to disengage said engaging means from said receiving portion only when said pedaling force exceeds said first threshold value and said pedal stroke is smaller than said second threshold value.

The present invention is characterized in that said predetermined condition is whether the pedaling speed exceeds a preset threshold value or not, and said engagement control means controls the engagement in such a manner as to maintain said engaging means in the engaged state with said receiving portion when said pedaling speed exceeds the preset threshold value and to disengage said engaging means from said receiving portion when said pedaling speed is lower than said preset threshold value.

The present invention is characterized in that said predetermined condition is whether said pedal member is moved backward from its inoperative position or not, and said engagement control means controls the engagement in such a manner as to disengage said engaging means from said receiving portion when said pedal member is moved backward from its inoperative position.

The present invention is characterized in that said predetermined condition is whether the pedal stroke exceeds a preset threshold value or not, and said engagement control means controls the engagement in such a manner as to maintain said engaging means in the engaged state with said receiving portion when said pedal stroke is shorter than the preset threshold value and to disengage said engaging means from said receiving portion when said pedal stroke exceeds said preset threshold value.

The present invention is characterized in that said predetermined condition is whether the power source of said booster is normal or not, and said pivotal movement control means controls the pivotal movement of said first lever member in such a manner as to prevent the pivotal movement of said first lever member when said power source is normal and to allow the pivotal movement of said first lever member when said power source fails.

In the brake pedal apparatus having the aforementioned structure, the pivotal movement control means controls the first lever member to be prevented from pivoting when the predetermined condition is not satisfied. As a result, the second lever member pivots about the second pivot pin, thereby setting the pedal leverage to correspond to the case that the predetermined condition is not satisfied. The pivotal movement control means controls the first lever member to be allowed to pivot together with the second lever member when the predetermined condition is satisfied. As a result, the second lever member pivots about the first pivot pin, thereby setting the pedal leverage to correspond to the case that the predetermined condition is satisfied. In this manner, the pedal leverage can be changed to corresponding to whether the predetermined condition is satisfied or not. Therefore, the aforementioned problems (1) through (5) can be effectively solved by variously setting the predetermined condition.

In the present invention, the input shaft of the booster or the input shaft of the master cylinder is pivotally connected to the second lever member at a position between the first pivot pin and the pedal member. Therefore, since the operating directions of the pedal member are equal to the stroke directions of the input shaft of the booster or the input shaft of the master cylinder, respectively, the booster or the master cylinder is arranged on the vehicle-front side, i.e. the side opposite to the driver, with respect to the first pivot pin. Accordingly, the brake pedal apparatus can be effectively installed in a vehicle of a type having a relatively larger space in front of a driver's seat, for example, a vehicle of a bonnet type from the viewpoint of efficient use of space.

Moreover, in the present invention, the input shaft of the booster or the input shaft of the master cylinder is pivotally connected to the second lever member at a position opposite to the pedal member with respect to the first pivot pin. Therefore, since the operating directions of the pedal member are opposite to the stroke directions of the input shaft of the booster or the input shaft of the master cylinder, respectively, the booster or the master cylinder is arranged on the vehicle-rear side, i.e. the driver side, with respect to the first pivot pin. Accordingly, the brake pedal apparatus can be effectively installed in a vehicle of a type having a relatively small space in front of a driver's seat, for example, a minivan from the viewpoint of efficient use of space.

In the present invention, the second lever member and the input shaft of the booster or the master cylinder are connected to each other via the third lever member, thereby increasing the degree of freedom in arrangement of the brake pedal apparatus. Accordingly, the brake pedal apparatus can be disposed below the input shaft of the booster. In this manner, the degree of freedom in arrangement of the pedal apparatus can be improved and the entire length of the assembly of the brake pedal apparatus, the booster and/or the master cylinder can be shortened.

According to the present invention, the pivotal movement control means is composed of the engaging means disposed on the first lever member, the receiving portion disposed on the vehicle body, the engagement control means for controlling the engagement between the engaging means and the receiving portion so that the pedal apparatus is structured simple.

Further in the present invention, the predetermined condition is whether the pedaling force exceeds a preset threshold value or not. When the threshold value for the pedaling force is set to be lower than that at the full load point of the booster, the brake system has the reversed two-stage servo characteristic. Therefore, since the pedal leverage is set to a smaller ratio during the normal braking when the pedaling force is smaller than the preset threshold value, that is, the predetermined condition is not satisfied, the pedal stroke can be shortened, thereby improving the pedaling feeling. Because of this reversed two-stage servo characteristic, a brake assist control (BA control) can be conducted in case of operation for emergency braking when the pedal stroke is large, thereby securing the emergency braking operation.

In case of failure of the amplifying action of the booster, since the pedaling force exceeds the preset threshold value, that is, the predetermined condition is satisfied, the pedal leverage can be changed to a larger ratio so that the driver's operational force can be assisted to have increased braking force, thereby enabling the brake to be operated with predetermined braking force even in case of failure of the amplifying action.

Furthermore, even after the full load point of the booster, the braking force can be assisted. Also when the threshold value for the pedaling force is set to be larger than that at the full load point, the braking force can be assisted even after the full load point in the same manner.

According to the present invention, the pedal stroke is also considered as the predetermined condition in addition to the pedaling force. That is, the predetermined condition is satisfied when the pedaling force exceeds the first preset value and the pedal stroke is shorter than the second preset value. This arrangement enables more precise and effective change in pedal leverage.

According to the present invention, the pedaling speed is considered as the predetermined condition. That is, the pedal leverage is set to the larger ratio when the pedaling speed is as low as the pedaling speed for the normal braking. By setting the larger ratio to be the same as the pedal leverage for the normal braking, predetermined braking force required for the normal braking can be obtained during the operation of the service braking.

On the other hand, the pedal leverage is set to the smaller ratio by engaging the engaging means with the receiving portion when the pedaling speed is higher than the pedaling speed for the normal braking. Therefore, large braking force can be obtained with a small pedal stroke. In particular, adopting the brake pedal apparatus to a brake assist control (BA control) enables a driver such as an inexpert driver, who can depress only the same level as the normal braking, to conduct emergency braking operation without fail.

Further, in the present invention, the movement of the pedal from its inoperative position is considered as the predetermined condition. That is, when the pedal is moved backward from its inoperative position, the engaging means comes off the receiving portion by the engagement control means, thereby preventing the backward movement of the pedal from its inoperative position and preventing the pedal from colliding with the driver.

Furthermore, in the present invention, the pedal stroke is considered as the predetermined condition. That is, the pedal leverage is set to be the smaller ratio because the engaging means is maintained in the engaged state with the receiving portion by the engagement control means when the pedal stroke is small. On the other hand, the pedal leverage is set to be the larger ratio because the engaging means is disengaged from the receiving portion when the pedal stroke is large. Therefore, long stroke of the input shaft can be obtained with small pedal stroke in the initial stage of depressing the pedal when the pedal leverage is set to the smaller ratio, and large output of the input shaft can be obtained with small pedaling force when the pedal stroke is set to the larger ratio.

Therefore, employment of the brakepedal apparatus enables the pedal leverage to be set to the smaller ratio when larger input of the input shaft is not necessary but somewhat longer stroke of the input is necessary for canceling the stroke loss at the WCYs, and enables the pedal leverage to be set to the larger ratio when somewhat larger input of the input shaft is necessary but longer stroke of the input shaft is not necessary after the stroke loss is cancelled. In this manner, even with large stroke loss at the WCYs, the same pedal stroke as the conventional one can be obtained, thereby enabling the employment of the "zero drag caliper". This arrangement can prevent the aforementioned "brake drag", thereby reducing power loss of an engine due to the "brake drag" and thus improving the fuel consumption.

Moreover, in the present invention, the failure of the power source of the booster is considered as the predetermined condition. That is, when the power source is normal, the first lever member is prevented from pivoting by the pivotal movement control means, whereby the pedal leverage is set to the small ratio for operating the service braking. Therefore, the normal braking operation can be conducted by normally depressing the pedal. In the event of failure of the power source, the first lever member is allowed to pivot by the pivotal movement control means, whereby the pedal leverage is set to be larger than the ratio for the normal braking. Because of the larger ratio, large braking force can be obtained. Therefore, even when the amplifying action of the vacuum booster fails due to the failure of the power source, predetermined braking force can be obtained, thereby ensuring the braking operation.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIGS. 1($a$), 1($b$) schematically show a first embodiment of a brake pedal apparatus according to the present invention, wherein FIG. 1($a$) is a front view thereof and FIG. 1($b$) is a right-side view thereof;

FIGS. 3($a$)–3($d$) show characteristics of the brake pedal apparatus of the first embodiment shown in FIGS. 1($a$), 1($b$), wherein FIG. 3($a$) is a graph showing a characteristic of the pedaling force versus the input of an input shaft, FIG. 3($b$) is a graph showing a characteristic of the pedal stroke versus the stroke of the input shaft, FIG. 3($c$) is a graph showing a characteristic of the pedal stroke versus the MCY pressure, and FIG. 3($d$) is a graph showing characteristics of the pedaling force versus the MCY pressure;

FIG. 4 is an illustration for explaining the engagement between a engaging means and a receiving portion in the brake pedal apparatus of the first embodiment shown in FIGS. 1($a$), 1($b$);

FIGS. 5($a$)–5($d$) show a brake pedal apparatus of a second embodiment according to the present invention, wherein FIG. 5($a$) is an illustration schematically and partially showing the state of allowing the change in pedal leverage, FIG. 5($b$) is an illustration schematically and partially showing the state of not allowing the change in pedal leverage, FIG. 5($c$) is a graph showing characteristics of pedaling force versus the MCY pressure, and FIG. 5($d$) is a graph showing characteristics of the pedal stroke versus the MCY pressure;

FIGS. 7($a$)–7($c$) show characteristics of the brake pedal apparatus of the third embodiment shown in FIGS. 6($a$)–6($c$), wherein FIG. 7($a$) is a graph showing a characteristic of the pedal stroke versus the stroke of the input shaft, FIG. 7($b$) is a graph showing a characteristic of the pedal stroke versus the MCY pressure, and FIG. 7($c$) is a graph showing a characteristic of the pedaling force versus the input of the input shaft;

FIGS. 8($a$)–8($d$) partially and schematically show a brake pedal apparatus of a fourth embodiment according to the present invention, wherein FIG. 8($a$) is an illustration showing its inoperative state, FIG. 8(b) is a partially enlarged view of a portion P in FIG. 8(a), FIG. 8(c) is an illustration showing its operative state, and FIG. 8(d) is a corresponding view of FIG. 8(b) and a partially enlarged view of the corresponding portion in FIG. 8(c);

FIGS. 9(a)–9(c) show a brake pedal apparatus of a fifth embodiment according to the present invention, wherein FIG. 9(a) is an illustration partially and schematically showing its inoperative state, FIG. 9(b) is a graph showing a characteristic of the pedal stroke versus the pedal leverage, FIG. 9(c) is a graph showing a characteristic of the pedal stroke versus the MCY pressure;

FIGS. 12(a), 12(b) schematically show the brake pedal apparatus of the seventh embodiment in its operative state, wherein FIG. 12(a) is an illustration similar to FIG. 11 and FIG. 12(b) is a partially enlarged view of FIG. 12(a).

FIGS. 13(a), 13(b) show the characteristic of the pedal stroke versus the pedal leverage in the brake pedal apparatus of the seventh embodiment, wherein FIG. 13(a) is a graph showing the characteristic when the engaging means and the receiving portion are engaged with each other, and FIG. 13(b) is a graph showing the characteristic when the engaging means and the receiving portion are not engaged with each other;

DESCRIPTION OF THE PREFERRED EMBODIMENTS

Figure 2:
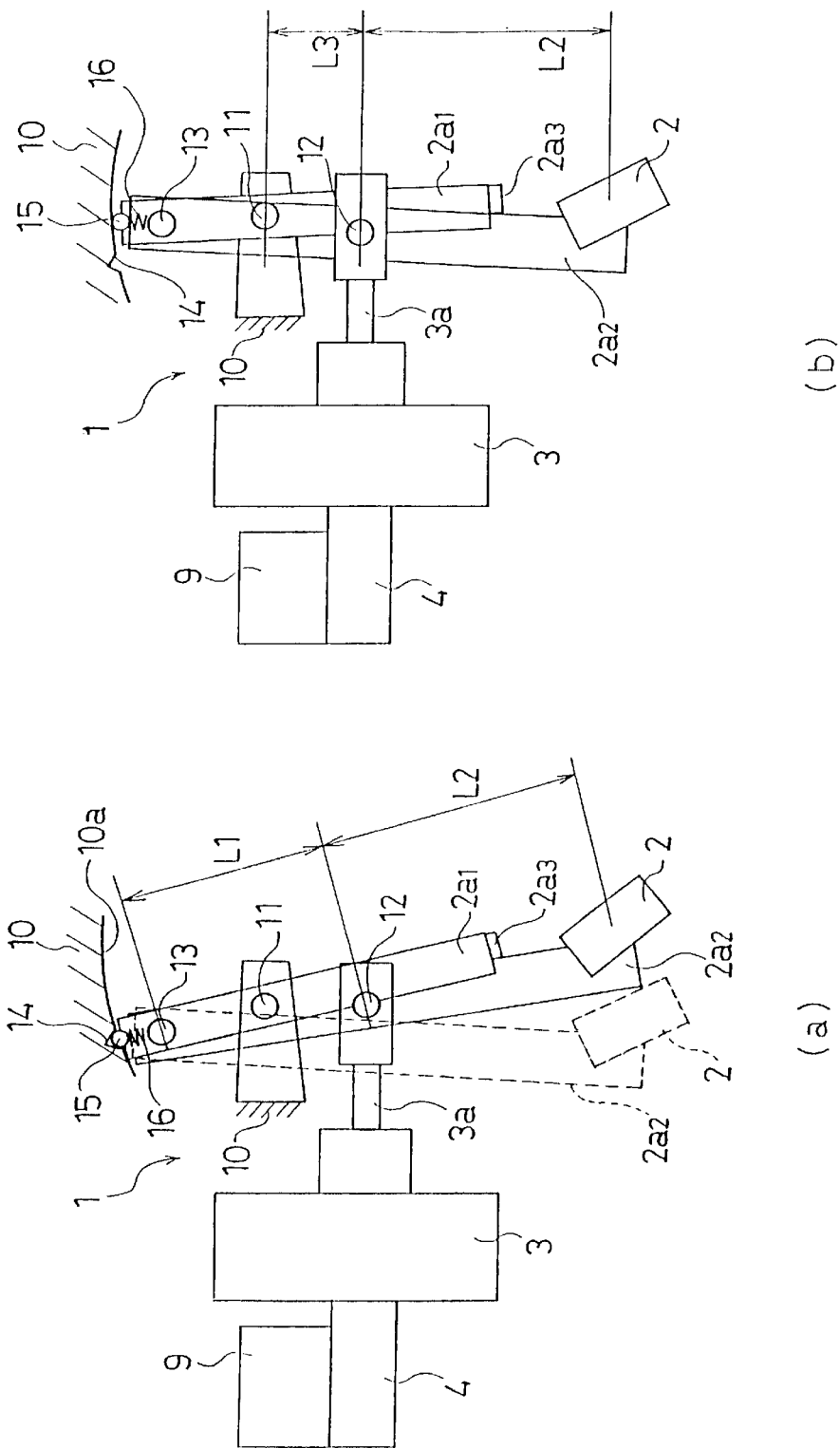
FIGS. 2($a$), 2($b$) are illustrations for explaining the change in pedal leverage of the first embodiment shown in FIGS. 1($a$), 1($b$), wherein FIG. 2($a$) is an illustration showing the state before the pedal leverage is changed and FIG. 2($b$) is an illustration showing the state after the pedal leverage is changed.

Hereinafter, embodiments of the present invention will be described with reference to the drawings.

FIGS. 1(a), 1(b) schematically show a first embodiment of a brake pedal apparatus according to the present invention, wherein FIG. 1(a) is a front view thereof and FIG. 1(b) is a right-side view thereof. Throughout the following embodiments, corresponding component parts are designated with the same reference numerals utilized in the prior embodiment(s) (including the conventional example), thus omitting the detail description of such component parts.

As shown in FIGS. 1(a), 1(b), a lever 2a for a brake pedal 2 comprises a first lever member $2a_1$ of which a middle portion is attached to a vehicle body (for example, a toe board) 10 by a first pivot pin 11 in such a manner that the first lever member $2a_1$ can pivot about the first pivot pin 11, and a second lever member $2a_2$ of which a lower end (corresponding to the other end of the present invention) is connected to the brake pedal (corresponding to the pedal member of the present invention) 2 and a middle portion is connected to an input shaft 3a of a booster 3 by a connection pin 12 in such a manner that the second lever member $2a_2$ can pivot relative to the input shaft 3a about the connection pin 12. The first and second lever members $2a_1$, $2a_2$ are connected each other at their upper ends (corresponding to the respective one ends of the present invention) by a second pivot pin 13 in such a manner that the first and second lever members $2a_1$, $2a_2$ can relatively pivot about the second pivot pin 13. The first lever member $2a_1$ is provided at its lower end (corresponding to the other end of the present invention) with a projection-like stopper portion $2a_3$ functioning as a coupling means. That is, as the first lever member $2a_1$ pivots in the clockwise direction in FIG. 1(a) relative to the second lever member $2a_2$, the stopper portion $2a_3$ comes in contact with the second lever member $2a_2$ so as to allow the first and second lever members $2a_1$, $2a_2$ to pivot together in the clockwise direction.

The vehicle body 10 has a curved surface 10a of which center coincides with the first pivot pin 11 and which is arranged to confront with the upper end of the first lever member $2a_1$. A receiving portion 14 composed of a V-like groove is formed in the curved surface 10a at a position confronting with the upper end of the first lever member $2a_1$. The first lever member $2a_1$ is provided at its upper end portion with an engaging means 15 such as a steel ball. The engaging means 15 is capable of moving relative to the curved surface 10a and of engaging the receiving portion 14. The engaging means 15 is always biased toward the curved surface 10a by a spring 16. In this case, the spring 16 composes an engagement control means of the present invention. In addition, the receiving portion 14, the engaging means 15, and the engagement control means cooperate to compose the pivotal movement control means of the present invention.

Normally, the engaging means 15 is set in the engaged state with the receiving portion 14 as shown in FIG. 1(a) and FIG. 2(a). With pedaling force $F_p$ not exceeding a threshold value $F_{p0}$, the engaging means 15 and the receiving portion 14 are held in the engaged state because the engaging means 15 receives a small releasing force applied from the second lever member $2a_2$. Therefore, as the brake pedal 2 is depressed with pedaling force $F_p$ not exceeding the threshold value $F_{p0}$ in the engaged state of the engaging means 15 and the receiving portion 14, the first lever member $2a_1$ does not pivot and the second pivot pin 13 does not move, so only the second lever member $2a_2$ rotates about the second pivot pin 13 in the clockwise direction as shown by dotted lines of FIG. 1(a) and FIG. 2(a). That is, brakes are operated only by the pivotal movement of the second lever member $2a_2$. During this operation, the pedal leverage is (L1 +L2)/L1, wherein L1 is a distance between the connection pin 12 and the second pivot pin 13, and L2 is a distance between an operational point of the second lever member $2a_2$, to which pedaling force is applied from the brake pedal 2, and the connection pin 12.

Though the pedal leverage of the pedal apparatus of this embodiment is the same as the aforementioned conventional pedal leverage in view of notation, the pedal leverage is actually set smaller than the conventional pedal leverage. Therefore, in the pedal apparatus of the embodiment, the input of the input shaft 3a of the booster 3 relative to the pedaling force is represented by a solid line in a graph of FIG. 3(a), that is, smaller than the input of the conventional one represented by a dotted line in the same graph.

In the engaged state of the engaging means 15 and the receiving portion 14, as the pedaling force $F_p$ on the brake pedal 2 exceeds the threshold value $F_{p0}$, the engaging means 15 receives a large releasing force applied from the second lever member $2a_2$ so that the second lever member $2a_2$ pivots about the connection pin 12 in the clockwise direction with this releasing force as shown in FIG. 2(b), whereby the engaging means 15 comes off the receiving portion 14. Then, the first lever member $2a_1$ becomes free to pivot and the second pivot pin 13 becomes free to move. Since the second lever member $2a_2$ further pivots about the connection pin 12 in the clockwise direction, the second pivot pin 13 rotates about the connection pin 12 in the clockwise direction. By the rotation of the second pivot pin 13, the first lever member $2a_1$ pivots about the first pivot pin 11 in the clockwise direction. Then, as shown in FIG. 2(b), the stopper portion $2a_3$ of the first lever member $2a_1$ comes in contact with the second lever member $2a_2$.

Actually, the contact of the stopper portion $2a_3$ with the second lever member $2a_2$ takes place relatively immediately after the engagement between the engaging means 15 and the receiving portion 14 is cancelled by the pedaling force $F_p$ exceeding the threshold value $F_{p0}$. However, since the brake pedal 2 should travel until the stopper portion $2a_3$ comes in contact with the second lever member $2a_2$, the pedal stroke is increased by this traveling. As will be described later, it is set such that the change of the pedal leverage is conducted in the event of emergency when it is necessary to securely output predetermined braking force. That is, the pedal stroke is increased a little in the event of emergency and is not affected during the normal braking.

After the contact of the stopper portion $2a_3$ with the second lever member $2a_2$, the first and second lever members $2a_1$, $2a_2$ are coupled by the stopper portion $2a_3$ so as to pivot together. That is, the brakes are operated by the pivotal movement of both the first and second lever members $2a_1$, $2a_2$. During this operation, the pedal leverage is $(L2+L3)/L3$, wherein L3 is a distance between the connection pin 12 and the first pivot pin 11 and L1>L3. Therefore, the pedal leverage when the engaging means 15 and the receiving portion 14 are in the disengaged state is larger than the pedal leverage when the engaging means 15 and the receiving portion 14 are in the engaged state.

In this case, the pedal leverage when the engaging means 15 and the receiving portion 14 are in the disengaged state is set to be larger than the aforementioned conventional pedal leverage. Accordingly, the input of the input shaft $3a$ of the booster 3 relative to the pedaling force is represented by a solid line in the graph of FIG. 3(a) and is greater than the input when the engaging means 15 and the receiving portion 14 are in the engaged state and also than the input of the conventional one.

The releasing force to be required to cancel the engagement of the engaging means 15 with the receiving portion 14 is given by the following equation:

$$F_d \geq \{(\sin \theta + \mu \cos \theta)/\{(1-\mu^2)\cos \theta - 2\mu \sin \theta\} \cdot F_s$$

wherein the releasing force exerted from the second lever member $2a_2$ to the ball as the engaging means 15 is represented by $F_d$, the biasing force of the spring 16 biasing the ball is represented by $F_s$, the inclination angle of the groove wall of the V-like groove 14 as the receiving portion 14 relative to the curved surface $10a$ of the vehicle body 10 is represented by $\theta$, the resistance force exerted to the ball by the groove wall is represented by R, the frictional force between the ball and the groove wall is represented by f1, and the frictional force between the ball and the second lever member $2a_2$ is represented by f2 as shown in FIG. 4. Further, assuming that the pedaling force is represented by $F_p$, because of $F_d = (L2/L1) \cdot F_p$, the following equation is obtained:

$$F_p \geq [\{(\sin \theta + \mu \cos \theta)/\{(1-\mu^2)\cos \theta - 2\mu \sin \theta\}] \cdot (L1/L2) \cdot F_s = F_{p0}$$

Therefore, when the pedaling force $F_p$ satisfies this equation ($F_p \geq F_{p0}$), that is, the pedaling force $F_p$ exceeds the threshold value $F_{p0}$, the ball comes off the V-like groove 14.

On the other hand, since the pedal leverage is smaller than the conventional pedal leverage until the pedaling force $F_p$ exceeds the threshold value $F_{p0}$ as described above, even with the same pedaling force $F_p$, the input of the input shaft $3a$ is smaller than the input according to the conventional pedal leverage so that MCY pressure should be also smaller than that of the conventional one. However, since the booster 3 is set to have the same output characteristic as the conventional one, the increase in MCY pressure is set to be the same as the conventional one.

In case of the relation between the pedaling force and the input of the input shaft represented by the solid line in FIG. 3(a), the relation between the pedal stroke and the stroke of the input shaft is represented by a solid line in FIG. 3(b). That is, before the pedaling force $F_p$ exceeds the threshold value $F_{p0}$ (at this point, the pedal stroke is $F_{L0}$), as the pedal stroke increases, the stroke of the input shaft $3a$ is increased by a ratio larger than that of the conventional one, and after the pedaling force $F_p$ exceeds the threshold value $F_{p0}$, as the pedal stroke increases, the stroke of the input shaft $3a$ is increased by a smaller ratio than that of the conventional one so that the characteristic is represented by an angular line composed of two straight lines. Further, the relation between the pedal stroke and the MCY pressure is shown in FIG. 3(c). That is, before the pedaling force $F_p$ exceeds the threshold value $F_{p0}$, as the pedal stroke increases, the MCY pressure is increased by a ratio larger than that of the conventional one, and after the pedaling force $F_p$ exceeds the threshold value $F_{p0}$, as the pedal stroke increases, the MCY pressure is increased along a curve raising at a lower ratio than that of the conventional one so that, on the whole, the pedal stroke is smaller than that of the conventional one relative to the same MCY pressure.

Though the aforementioned threshold value $F_{p0}$ can be arbitrarily set, the value is above the maximum value that can be reached during the operation of service braking. There are generally three cases as follows: referring to FIG. 3(d), (1) where the threshold value $F_{p0}$ is set to be smaller than pedaling force $F_{pb}$ corresponding to the full load point α of a booster of which pedal leverage is constant (typical conventional one) ($F_{p0} < F_{pb}$);

(2) where the threshold value $F_{p0}$ is set to be equal to the pedaling force $F_{pb}$ ($F_{p0} = F_{pb}$); and (3) where the threshold value $F_{p0}$ is set to be greater than the pedaling force $F_{pb}$ ($F_{p0} > F_{pb}$).

In the case (1) $F_{p0} < F_{pb}$, the characteristic of the pedaling force $F_p$ versus the MCY pressure (hereinafter, sometimes referred to as "pedaling force $F_p$—the MCY pressure characteristic") is represented by "a" in FIG. 3(d). That is, the threshold value $F_{p0}$ is set to be pedaling force $F_{pa}$ which is smaller than the pedaling force $F_{pb}$ ($F_{p0} = F_{pa}$). With this characteristic, during the normal operation of the booster, the pedal leverage is a smaller ratio $(L1+L2)/L1$. Accordingly, as the pedaling force $F_p$ increases, the MCY pressure is linearly increased along a solid line "a" by the same booster ratio as the conventional booster ratio (in the present invention, the booster ratio is the total of the servo ratio of the booster and the pedal leverage) until the pedaling force $F_p$ reaches the pedaling force $F_{pa}$. In this case, even when the pedal leverage is smaller than that of the conventional one as shown in FIG. 3(a), the booster has the same output (amplifying) characteristic as the conventional one because the servo ratio of the booster is set to be greater than that of the conventional booster so that the booster ratio totally becomes equal to that of the conventional booster.

During the normal braking that the service brake is operated by normal depression of the brake pedal 2, the pedaling force $F_p$ does not reach the threshold value $F_{p0}$, that is, the predetermined condition is not satisfied so that the engaging means 15 remains in the engaged state with the receiving portion 14. In this state, only the second lever member $2a_2$ pivots about the second pivot pin 13 in the clockwise direction in FIG. 1(a) and FIG. 2(a) so as to move apart from the stopper portion $2a_3$ of the first lever member $2a_1$. Therefore, the pedal leverage is not changed i.e. is maintained at the small pedal leverage (L1+L2)/L1 corresponding to the case that the predetermined condition is not satisfied. As the operation of the service brake is cancelled by releasing the brake pedal 2, the second lever member $2a_2$ pivots in the counterclockwise direction until coming in contact with the stopper portion $2a_3$ so as to return to the initial position i.e. the inoperative position, thereby canceling the normal braking.

As the brake pedal 2 is depressed, for example for emergency braking, with stronger force than that for the normal braking and the pedaling force $F_p$ exceeds the pedaling force $F_{pa}$ as the threshold value $F_{p0}$, that is, the predetermined condition is satisfied, the engaging means 15 is allowed to come off the receiving portion 14 to allow the pivotal movement of the first lever member $2a_1$ as described above. Then, the first lever member $2a_1$ pivots about the first pivot pin 11 in the clockwise direction in FIG. 1(a) and FIG. 2(a) and the second lever member $2a_2$ also pivots about the connection pin 12 in the same direction. During this, since the amount of pivotal movement of the first lever member $2a_1$ is larger than the amount of pivotal movement of the second lever member $2a_2$, the stopper portion $2a_3$ immediately comes in contact with the second lever member $2a_2$ and, after that, the first and second lever members $2a_1$, $2a_2$ pivot together about the first pivot pin 11. Therefore, the pedal leverage is changed to a larger ratio (L2+L3)/L3. That is, as the pedaling force $F_p$ increases, the MCY pressure is increased by a booster ratio larger than the conventional booster ratio, thus having a so-called reversed two-stage servo characteristic.

In this manner, brake assist control (BA control) is conducted, whereby increased braking force can be obtained by assisting the driver's operational force. The booster can achieve the full load point α' with pedaling force $F_{pd}$ smaller than the pedaling force $F_{pb}$ that is needed to achieve the full load point a when the pedal leverage is not changed. As the pedaling force $F_p$ exceeds the pedaling force $F_{pd}$ at the full load point α', the booster stops its amplifying action. However, even after that, the MCY pressure is increased along the line "a" because the pedaling force $F_p$ is amplified by the increased pedal leverage, thereby further assisting the driver's operational force.

As the brake pedal 2 is released, the first and second lever members $2a_1$, $2a_2$ pivot together about the first pivot pin 11 in the counterclockwise direction to return to the initial positions i.e. inoperative positions, still keeping the second lever member $2a_2$ and the stopper portion $2a_3$ being in contact with each other. At this point, the engaging means 15 engages the receiving portion 14.

In case of failure of the amplifying action of the booster, until the pedaling force $F_p$ reaches the pedaling force $F_{pa}$, the pedal leverage is set to be smaller than the conventional pedal leverage. Accordingly, as the pedaling force $F_p$ increases, the MCY pressure is linearly increased along a solid line "a" by a ratio smaller than the conventional one represented by a dotted line. As the pedaling force $F_p$ reaches the pedaling force $F_{pa}$, the pedal leverage is changed to be larger. Because of the increased pedal leverage, the MCY pressure is linearly increased by a ratio significantly larger than the conventional one represented by the dotted line, thereby assisting the driver's operational force.

In the case (1), during the normal braking, the pedal stroke can be shortened, thereby improving the pedaling feeling, and the BA control can be conducted in case of operation for emergency braking, thereby securing the emergency braking operation.

In case of failure of the amplifying action of the booster, since the pedal leverage is changed to be larger, the driver's operational force can be assisted to have increased braking force. Accordingly the brake is operated with predetermined braking force even in case of failure of the amplifying action.

In the case (2) $F_{p0}=F_{pb}$, that is, where the threshold value $F_{p0}$ is set to the pedaling force $F_{pb}$, the pedaling force $F_p$—the MCY pressure characteristic is represented by "b" in FIG. 3(d). With this characteristic, during the normal operation of the booster, as the pedaling force $F_p$ increases, the MCY pressure is linearly increased along a solid line "b" by the same booster ratio as the conventional booster ratio represented by the dotted line until the booster achieves the full load point α.

When the booster achieves the full load point α, the pedaling force $F_p$ becomes the pedaling force $F_{pb}$ as the threshold value $F_{p0}$ so that the engaging means 15 comes off the receiving portion 14 as described above, whereby the pedal leverage is changed to the larger ratio. Because of the increased pedal leverage, even though the amplifying action of the booster is no more conducted after the full load point, as the pedaling force $F_p$ increases, the MCY pressure is linearly increased by a ratio larger than that of the conventional one.

In case of failure of the amplifying action of the booster, until the pedaling force $F_p$ reaches the pedaling force $F_{pb}$, as the pedaling force $F_p$ increases, the MCY pressure is linearly increased along a solid line "b" by a ratio smaller than the conventional one represented by the dotted line since the pedal leverage is set to be smaller than the conventional pedal leverage. As the pedaling force $F_p$ reaches the pedaling force $F_{pb}$, the pedal leverage is changed to be larger. Therefore, the MCY pressure is linearly increased by a ratio significantly larger than that of the conventional one illustrated by the dotted line.

The case (2) may be applied to a case where MCY pressure larger than the conventional MCY pressure is required for assisting driver's operational force even after the full load point of the booster. In the case (2), the reversed two-stage servo characteristics as obtained in the case (1) can not be obtained. It should be noted that this case (2) can be applied to the BA control similarly to the case (1).

The other characteristics and other works and effects of the case (2) are the same as those of the case (1).

In the case (3) $F_{p0}>F_{pb}$, the pedaling force $F_p$—the MCY pressure characteristic is represented by "c" in FIG. 3(d). That is, the threshold value $F_{p0}$ is set to be a pedaling force $F_{pc}$ larger than the pedaling force $F_{pb}$ ($F_{p0}=F_{pc}$). With this characteristic, during the normal operation of the booster, as the pedaling force $F_p$ increases, the MCY pressure is linearly increased along a solid line "c" by the same booster ratio as the conventional booster ratio represented by the dotted line until the pedaling force $F_p$ reaches to the pedaling force $F_{pc}$ passing over the full load point α.

When the pedaling force $F_p$ becomes the pedaling force $F_{pc}$ passing over the full load point α of the booster, the engaging means 15 comes off the receiving portion as described above, whereby the pedal leverage is changed to the larger ratio. Because of the increased pedal leverage, from a point during the amplifying action of the booster is no more conducted after the full load point, as the pedaling force $F_p$ increases, the MCY pressure is linearly increased by a ratio than that of the conventional one.

In case of failure of the amplifying action of the booster, until the pedaling force $F_p$ reaches the pedaling force $F_{pc}$, as the pedaling force $F_p$ increases, the MCY pressure is linearly increased along a solid line "c" by a ratio smaller than the conventional one represented by the dotted line because the pedal leverage is set to be smaller than the conventional pedal leverage. As the pedaling force $F_p$ reaches the pedaling force $F_{pc}$, the pedal leverage is changed to be larger. Therefore, the MCY pressure is linearly increased by a ratio significantly larger than that of the conventional one illustrated by the dotted line.

The case (3) may be applied to a case where MCY pressure larger than the conventional MCY pressure is required for assisting driver's operational force after a point during the amplifying action of the booster is no more conducted after the full load point of the booster.

The other characteristics and other works and effects of the case (3) are the same as those of the case (1).

As described above, the second lever member $2a_2$ can be controlled to switch its pivot point by preventing the pivotal movement of the first lever member $2a_1$ when the predetermined condition is not satisfied and allowing the first lever member $2a_1$ to pivot together with the second lever member $2a_2$ when the predetermined condition is satisfied, thereby easily changing the pedal leverage.

By the way, in the brake pedal apparatus 1 of the first embodiment, the input shaft 3a of the booster 3 is pivotally connected to the second lever member $2a_2$ at a position between the first pivot pin 11 and the brake pedal 2. Therefore, since the operating directions β, β' of the brake pedal are equal to the stroke directions γ, γ' of the input shaft 3a of the booster 3, respectively, the booster 3 is arranged on the vehicle-front side, i.e. the side opposite to the driver, with respect to the first pivot pin 11. Accordingly, the brake pedal apparatus of the first embodiment can be effectively installed in a vehicle of a type having a relatively larger space in front of a driver's seat, for example, a vehicle of a bonnet type from the viewpoint of efficient use of space.

FIGS. 5(a), 5(b) are illustrations schematically and partially showing a brake pedal apparatus of a second embodiment according to the present invention.

Though the brake pedal apparatus of the first embodiment is structured to change the pedal leverage regardless of whether the booster normally operates or fails to amplify force, the brake pedal apparatus of the second embodiment is structured not to change the pedal leverage when the booster normally operates and to change the pedal leverage only when the booster fails to amplify force.

That is, as shown in FIG. 5(a), the first lever member $2a_1$ is provided with a supporting rod 17 which is disposed to be movable in the longitudinal direction of the first pedal member $2a_1$. The supporting rod 17 pushes the engaging means 15 to hold the engaging means 15 and the receiving member 14 in their engaged state. Further, the second lever member $2a_2$ is provided with a cam 18 disposed on the brake pedal 2 side of the second pivot pin 13. The cam 18 comprises a non-pressing face 18a which does not press the supporting rod 17, a pressing face 18b which presses the supporting rod 17, and an inclined face 18c connecting the non-pressing face 18a and the pressing face 18b smoothly.

The faces 18a, 18b, and 18c of the cam 18 are designed to satisfy the following conditions. That is, when the brake pedal 2 is released (in the inoperative state of the brake system), the cam 18 is positioned not to press the press rod 17 where the non-pressing face 18a is in contact with the supporting rod 17 as shown in FIG. 5(a). Since the cam 18 does not press the supporting rod 17, the supporting rod 17 does not press the engaging means 15 so that the engaging means 15 is free to come off the receiving portion 14. A spring 16, the supporting rod 17, and the cam 18 compose the engagement control means of the present invention.

As the second lever member $2a_2$ pivots about the second pivot pin 13 because of the depression of the brake pedal 2, the cam 18 moves to the left as indicated by an arrow in FIG. 5(a). When the pedal stroke reaches 40% of the maximum stroke for the normal braking operation, the inclined face 18c starts to press the supporting rod 17. When the pedal stroke reaches 70% of the maximum stroke for the normal braking operation, the cam 18 is set in the full press position where pressing face 18b presses the supporting rod 17 by a predetermined amount as shown in FIG. 5(b). Therefore, at this point, the cam 18 sets the supporting rod 17 to the holding position by the pressing face 18b. Since the supporting rod 17 in this holding position stops the engaging means 15 which is about to come off the receiving portion 14, the engaging means 15 can not come off the receiving portion 14.

During the normal operation of the booster, the cam 18 is set to the position where the pressing face 18b is in contact with the supporting rod 17 as shown in FIG. 5(b) before the pedaling force $F_p$ reaches the threshold value $F_{p0}$. In case of failure of the amplifying action of the booster, the cam 18 is not set to the holding position because less MCY pressure is produced and the pedal stroke does not increase. Therefore, during the normal operation of the booster, the pedal leverage is never changed because the supporting rod 17 is set to its holding position to hold the engagement between the engaging means 15 and the receiving portion 14 before the pedal leverage is changed. In case of failure of the amplifying action of the booster, the pedal leverage is allowed to be changed because the supporting rod 17 is not set to its holding position.

It should be noted that the reference values in the pedal stroke for actuating the supporting rod 17 are not limited to 40% and 70% and may be arbitrarily set.

The other components of the second embodiment are the same as those of the first embodiment.

With the brake pedal apparatus of the second embodiment having the aforementioned structure, since the pedal leverage is not changed during the normal operation of the booster, the booster has the same pedaling force—the MCY pressure characteristic as that of the conventional booster as shown in FIG. 5(c) and has the same pedal stroke—MCY pressure characteristic as that of the conventional booster as shown in FIG. 5(d). In the event of failure of the amplifying action of the booster, as the pedaling force $F_p$ exceeds the threshold value $F_{p0}$, the pedal leverage is changed to be larger so that the brake pedal apparatus has a pedaling force—MCY pressure characteristic as shown in FIG. 5(c) so as to assist the braking force (MCY pressure) by the large pedal leverage, thereby producing large MCY pressure. In addition, the brake pedal apparatus has a pedal stroke—MCY pressure characteristic as shown in FIG. 5(d), thereby producing relatively long pedal stroke.

In this case, the pedaling force and the MCY pressure are slightly decreased and the brake pedal 2 is slightly advanced until the stopper portion $2a_3$ comes in contact with the second lever member $2a_2$ for changing the pedal leverage as mentioned above {this feature while the pedal leverage is changed is indicated in FIG. 5(c) and FIG. 5(d); the indication of the feature is omitted in FIG. 3(c) and FIG. 3(d)}. However, since obtaining predetermined braking force is the most important thing, this feature at the point where the pedal leverage is changed leads to no particular problem.

The other actions and other works and effects of the second embodiment are the same as those of the first embodiment.

Figure 6:
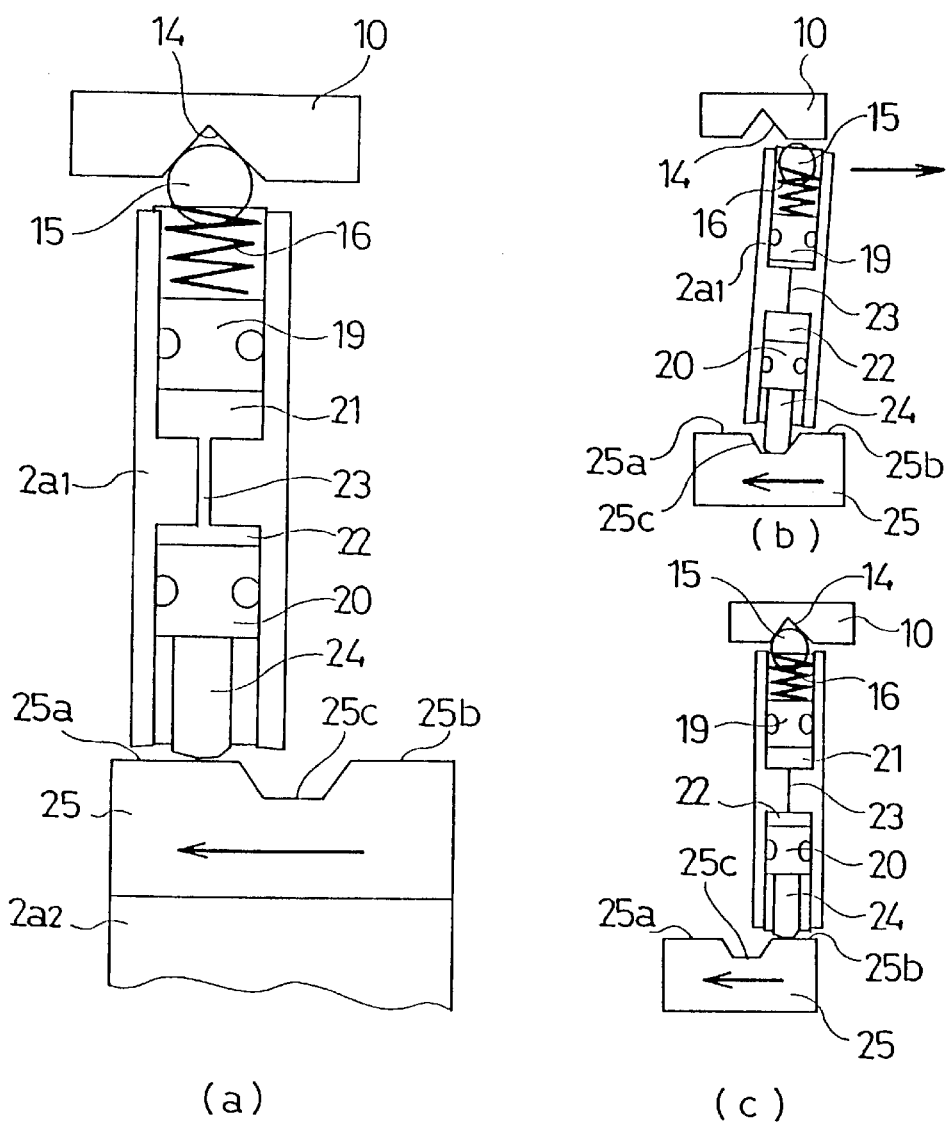
FIGS. 6($a$)–6($c$) schematically and partially show a brake pedal apparatus of a third embodiment according to the present invention, wherein FIG. 6($a$) is an illustration showing its inoperative state, FIG. 6($b$) is an illustration for explaining the operation when the pedaling speed is low, and FIG. 6($c$) is an illustration for explaining the operation when the pedaling speed is high.

FIGS. 6(a)–6(c) are illustrations schematically and partially showing a brake pedal apparatus of a third embodiment according to the present invention.

Though the aforementioned apparatus of the second embodiment is designed not to change the pedal leverage during the normal operation of the booster and to change the pedal leverage when the pedal stroke exceeds the threshold value in the event of failure of the amplifying action of the booster by means of the supporting rod 17, the apparatus of the third embodiment is designed to set the pedal leverage according to the pedaling speed of the brake pedal 2.

That is, as shown in FIG. 6(a), in the brake pedal apparatus of the third embodiment, the first lever member $2a_1$ is provided with a pair of first and second pistons 19, 20 such that these pistons 19, 20 are fluid-tightly slidable. Further, first and second fluid chambers 21 and 22 defined by the first and second pistons 19 and 20 are formed in the first lever member $2a_1$. The first and second fluid chambers 21, 22 always communicate with each other via an orifice 23. Fluid is filled in the first and second fluid chambers 21, 22 and the orifice 23. The first piston 19 is in contact with a spring 16 and the second piston 20 has an engaging rod 24 projecting therefrom.

On the other hand, the second lever member $2a_2$ is provided with an engaging member 25 positioned at the brake pedal 2 side of the second pivot pin 13. The engaging member 25 comprises first and second non-engaging portions 25a, 25b which do not engage the engaging rod 24 in the pedaling direction and an engaging portion 25c composed of a groove engaging the engaging rod 24 in the pedaling direction.

The portions 25a, 25b, and 25c of the engaging member 25 are designed to satisfy the following conditions. That is, when the brake pedal 2 is released (in the inoperative state of the brake system), the engaging member 25 is set to a position where the first non-engaging portion 25a confronts the engaging rod 24 as shown in FIG. 6(a). Since the first non-engaging portion 25a in this position presses the engaging rod 24 upwardly, the first piston 19 is pressed via the second piston 20, fluid in the first and second fluid chambers 21, 22 and further the engaging means 15 is pressed to engage the receiving portion 14 via the spring 16. Accordingly, the engaging means 15 can not come off the receiving portion 14. The spring 16, the first and second pistons 19, 20, the first and second fluid chambers 21, 22, the orifice 23, the engaging rod 24, and the engaging member 25 compose the engagement control means of the present invention.

As the second lever member $2a_2$ pivots about the second pivot pin 13 because of the depression of the brake pedal 2, the engaging member 25 moves to the left as indicated by an arrow in FIG. 6(a). Since at this point, the engaging member 25 does not engage the engaging rod 24, the first lever member $2a_1$ does not pivot. By the leftward movement of the engaging member 25, the engaging portion 25c moves to the position corresponding to the engaging rod 24 immediately, thereby canceling the pressing force on the engaging rod 24 by the engaging member 25. Then, the first piston 19 is moved downwardly by biasing force of the spring 16. At the same time, the fluid in the first fluid chamber 21 is throttled to flow into the second fluid chamber 22 so that the second piston 20 is also moved downwardly at a speed limited by the throttling effect.

When the pedaling speed is lower than the predetermined speed at this point, as shown in FIG. 6(b), the engaging rod 24 comes in contact with the engaging portion 25c before the second non-engaging portion 25b moves to a position corresponding to the engaging rod 24, whereby the engaging member 25 engages the engaging rod 24 in the pedaling direction. That is, the first and second lever members $2a_1$, $2a_2$ are coupled to each other. In this case, the engaging portion 25c and the engaging rod 24 compose the coupling means. Therefore, the first and second pistons 19, 20 are set to their lowest positions so that the pressing force pressing the engaging means 15 by the spring 16 is reduced, thereby allowing the engaging means 15 to come off the receiving portion 14. In this state, as the brake pedal 2 is further depressed, the first and second lever members $2a_1$, $2a_2$ pivot together and the engaging means 15 comes off the receiving portion 14 as shown in FIG. 6(b), whereby the pedal leverage is set to the larger ratio as mentioned above.

On the other hand, when the pedaling speed is higher than the predetermined speed, the engaging portion 25c passes a position corresponding to the engaging rod 24 before the engaging portion 25c engages the engaging rod 24 so that the second non-engaging portion 25b comes to a position corresponding to the engaging rod 24 as shown in FIG. 6(c). Therefore, the engaging member 25 does not engage the engaging rod 24. In this state, the first and second lever members $2a_1$, $2a_2$ are not joined to each other and the first and second piston 19, 20 are maintained at their initial positions where the engaging means 15 can not come off the receiving portion 14. In this state, even with further depression of the brake pedal 2, the engaging means 15 never comes off the receiving portion 14 as shown in FIG. 6(c), whereby the pedal leverage is set to the smaller ratio as mentioned above.

Therefore, in the third embodiment, the pedal leverage is set to the larger ratio when the pedaling speed of the brake pedal 2 is lower than the predetermined speed and the pedal leverage is set to the smaller ratio when the pedaling speed is higher than the predetermined speed. It should be noted that the threshold value $F_{p0}$ as used in the first and second embodiments is not used in the third embodiment, so that the change in pedal leverage depends on the pedaling speed.

The brake pedal apparatus of the third embodiment is suitable for the brake assist (BA) control.

That is, when the brake pedal apparatus of the third embodiment is suitably adopted to the BA control, the relation between the pedal stroke and the stroke of the input shaft 3a is illustrated in FIG. 7(a) in which the stroke of the input shaft 3a for the emergency braking (i.e. when the pedaling speed is high) is larger than that for the normal braking (i.e. when the pedaling speed is low) relative to the same pedal stroke. In other words, the pedal stroke for the emergency braking is shorter than that for the normal braking. Therefore, the pedal stroke—MCY pressure characteristic is illustrated in FIG. 7(b) in which the MCY pressure for the emergency braking is larger than that for the normal braking relative to the same pedal stroke.

Generally, for the emergency braking, most drivers can depress the brake pedal 2 with a stroke exceeding that for the normal braking. However, some drivers such as inexpert drivers can not depress the brake pedal 2 enough and can depress only the same level as the normal braking. Adopting the brake pedal apparatus of the third embodiment to the BA control enables such a driver to conduct emergency braking operation without fail.

According to the third embodiment, the input of the input shaft 3a during the emergency braking is smaller than that during the normal braking relative to the same pedaling force as shown in FIG. 7(c). This means that the larger pedaling force is required for the emergency braking. Accordingly, the driver feels the depression of the brake pedal 2 for the emergency braking somewhat heavier. However, it has been found from various studies and experiments that drivers as mentioned above can depress the brake pedal 2 to the same level as the normal braking even through the depression of the brake pedal becomes somewhat heavier. Therefore, even such drivers can depress the brake pedal 2 to the same level as the normal braking when the emergency braking is required, thereby obtaining large MCY pressure and thus conducting emergency braking operation without fail.

Though the BA control according to the reversed two-stage servo characteristic of the aforementioned first embodiment and the conventional BA control are designed for assisting such a driver, who can not produce predetermined pedaling force when the emergency braking is required, by reducing the required pedaling force, the BA control of the third embodiment is designed for assisting such a driver, who can not produce a predetermined pedal stroke when the emergency braking is required, by reducing the required pedal stroke. It is preferable that a pedaling force reducing mechanism and a pedal stroke reducing mechanism are suitably combined for assisting drivers of two aforementioned types when the emergency braking is required by reducing the required pedaling force and reducing the required pedal stroke.

The other components, other actions, other works and effects of the third embodiment are the same as those of the first embodiment.

FIGS. 8(a)–8(d) are illustrations for schematically and partially showing a brake pedal apparatus of a forth embodiment according to the present invention.

Though the aforementioned first through third embodiments relate to generation of braking force and pedaling feeling depending on the change in pedal leverage, the brake pedal apparatus of the fourth embodiment is designed to prevent the brake pedal 2 from being moved backward when the vehicle comes in frontal collision with an obstacle so that the MCY and the booster of the brake system are pressed backward.

That is, in the brake pedal apparatus of the fourth embodiment shown in FIGS. 8(a), 8(b), instead of the stopper portion $2a_3$ as the coupling means of the brake pedal apparatus of the first embodiment, a stopper member 26 is provided which is separate from the first lever member $2a_1$. The stopper member 26 is arranged by a suitable means such a manner that the stopper member 26 can move for a predetermined amount relative to the first lever member $2a_1$. In addition, a lever stopper means 27 is arranged on a vehicle body side at a position behind (on the right hand side in the drawings) the inoperative position of the first lever member $2a_1$ with a predetermined distance therebetween as shown in FIG. 8(b). The lever stopper means 27 comprises a L-like member 27a and a spring 27b for always biasing the first lever member $2a_1$ forward (to the left in the drawings). When the first lever member $2a_1$ moves backward from its inoperative position, the lever stopper means 27 receives the first lever member $2a_1$ by the spring 27b so as to prevent the first lever member $2a_1$ from further moving backward.

The stopper member 26 is arranged between the end surface of the first lever member $2a_1$ and a horizontal portion of the L-like member 27 in such a manner that the stopper member 26 can move relative to the first lever member $2a_1$ and the L-like member 27. The first lever member $2a_1$ is provided with a V-like groove 28 formed in a surface confronting with the stopper member 26 and the horizontal portion of the L-like member 27 is provided with a V-like groove 29 formed in a surface confronting with the stopper 26. Moreover, the stopper member 26 has a central hole in which an engaging member 30 such as a steel ball is disposed in such a manner that the engaging member 30 freely rotates. The engaging member 30 can engage both of the V-like grooves 28, 29. When the engaging member 30 engages the V-like groove 29, the engaging member 30 comes off the V-like groove 28 so that the first lever member $2a_1$ is allowed to move relative to the stopper member 26. The stopper member 26, the L-like member 27, the V-like grooves 28, 29, and the engaging member 30 compose the engagement control means of the present invention.

It should be noted that the threshold value $F_{p0}$ as used in the first embodiment is not used in the fourth embodiment The other components of the fourth embodiment are the same as those of the first embodiment.

According to the fourth embodiment having the aforementioned structure, in the inoperative state, the first lever member $2a_1$ is in the inoperative position as shown in FIG. 8(b). In this inoperative position, the engaging member 30 engages the V-like groove 28 and comes off the V-like groove 29. The first lever member $2a_1$ is biased forward by the spring force of the spring 27b so that the stopper member 26 is in contact with the second lever member $2a_2$. That is, the brake pedal apparatus of the fourth embodiment is in the state similar to that of the first embodiment because of the stopper member 26 corresponding to the stopper $2a_3$.

As the service brake is operated by normal depression of the brake pedal 2 for normal braking, only the second lever member $2a_2$ pivots about the second pivot pin 13 because the engaging means 15 engages the receiving portion 14, thus operating the service brake.

When the vehicle comes in collision with an obstacle and the MCY 4 and the booster 3 of the brake system are thus moved backward as shown in FIG. 8(c), the second lever member $2a_2$ pivots backward (in the counterclockwise direction in FIG. 8(c)) so that the brake pedal 2 is also moved backward. By the backward movement of the second lever member $2a_2$, the second lever member $2a_2$ presses the first lever member $2a_1$ backward so that the first lever member $2a_1$ pivots about the first pivot pin 11 together with the stopper member 26 in the same direction. Then, the engaging means 15 temporally comes off the receiving portion 14 so that the upper end portion of the first lever member $2a_1$ i.e. the second pivot pin 13 move somewhat forward (to the left in FIG. 8(c)) and the engaging member 30 comes off the V-like groove 28 and engage the V-like groove 29. Accordingly, the stopper member 26 engages the lever stopper means 27, thereby preventing the backward movement of the stopper member 26 and preventing the further backward movement of the lower end portion of the second lever member $2a_2$.

By the backward movement of the booster 3, the second lever member $2a_2$ is further pressed backward via the connecting pin 12 so that the second lever member $2a_2$ pivots in the clockwise direction in FIG. 8(c) about a point where the second lever member $2a_2$ is in contact with the stopper member 26. Therefore, the upper end portion of the second lever member $2a_2$ is moved backward (to the right in FIG. 8(c)) together with the upper end portion of the first lever member $2a_1$ and the second pivot pin 13. At this point, the engaging means 15 comes off the receiving portion 14 immediately after it temporally engages the receiving portion 14.

In this way, the lower end portions of the first and second lever members $2a_1$, $2a_2$ are stopped from moving backward and thereby from colliding with legs of the driver.

The force exerted on the lever stopper means 27 by the second lever member $2a_2$ may become not so large because the upper end portions of the first and second lever members $2a_1$, $2a_2$ are moved backward.

When the vehicle comes in collision with an obstacle during the driver depresses the brake pedal 2, the pedaling force of the driver works as force of moving the first and second lever members $2a_1$, $2a_2$ to pivot in the clockwise direction, thereby further effectively preventing the backward movement of the lower end portions of the first and second lever members $2a_1$, $2a_2$. Biasing force of the spring 27b also works as force of moving the first and second lever members $2a_1$, $2a_2$ to pivot in the clockwise direction, thereby more effectively preventing the backward movement of the lower end portions of the first and second lever members $2a_1$, $2a_2$.

The other actions and other works and effects of the fourth embodiment are the same as those of the first embodiment.

FIG. 9(a) is an illustration schematically and partially showing a brake pedal apparatus of a fifth embodiment according to the present invention.

Though the pedal leverage is changed to the larger ratio when the pedaling force $F_p$ exceeds the threshold value $F_{p0}$ in the aforementioned first embodiment, the pedal leverage is changed to the larger ratio when the pedal stroke exceeds the threshold value in the brake pedal apparatus of the fifth embodiment.

That is, as shown in FIG. 9(a), the first lever member $2a_1$ is provided with an engaging rod 24 such that the engaging rod 24 can move in the longitudinal direction of the first lever member $2a_1$. The engaging rod 24 in its operative state presses the engaging means 15 to maintain the engaging means 15 and the receiving member 14 in their engaged state. Further, the second lever member $2a_2$ is provided with an engaging member 25 positioned at the brake pedal 2 side of the second pivot pin 13. The engaging member 25 comprises a non-engaging portions 25a which does not engage the engaging rod 24 in the pedaling direction and presses the engaging rod 24 to maintain the engaging means 15 in the engaged state with the receiving portion 14 and an engaging portion 25c composed of a groove which engages the engaging rod 24 in the pedaling direction and does not press the engaging rod 24.

The portions 25a and 25c of the engaging member 25 are designed to satisfy the following conditions. That is, when the brake pedal 2 is released (in the inoperative state of the brake system), the engaging member 25 is set to a position where the non-engaging portion 25a confronts the engaging rod 24 as shown in FIG. 9(a). Since the non-engaging portion 25a in this position presses the engaging rod 24 upwardly, the engaging means 15 engages the receiving portion 14. Accordingly, the engaging means 15 can not come off the receiving portion 14.

As the second lever member $2a_2$ pivots about the second pivot pin 13 because of the depression of the brake pedal 2, the engaging member 25 moves to the left as indicated by an arrow in FIG. 9(a). Since at this point, the engaging member 25 does not engage the engaging rod 24, the first lever member $2a_1$ does not pivot. As the pedal advances by a predetermined amount, the engaging portion 25c moves to the position corresponding to the engaging rod 24 and the engaging rod 24 moves downwardly because of the weight itself to come in contact with the engaging portion 25c, thereby canceling the pressing force on the engaging rod 24 by the engaging member 25. Thus, the engaging member 25 engages the engaging rod 24 in the pedaling direction. That is, the first and second lever members $2a_1$, $2a_2$ are coupled to each other. In this case, the engaging portion 25c and the engaging rod 24 compose the coupling means. Therefore, the engaging means 15 is allowed to come off the receiving portion 14. In this state, as the brake pedal 2 is further depressed, the first and second lever members $2a_1$, $2a_2$ pivot together and the engaging means 15 comes off the receiving portion 14, whereby the pedal leverage is set to the larger ratio as mentioned above.

Therefore, in the fifth embodiment, the pedal leverage is set to the smaller ratio when the pedal stroke of the brake pedal 2 is shorter than the threshold value, and the pedal leverage is set to the larger ratio when the pedal stroke of the brake pedal exceeds the threshold value. It should be noted that the threshold value $F_{p0}$ as used in the first and second embodiments is not used in the fifth embodiment, so that the change in pedal leverage depends on the pedal stroke.

The brake pedal apparatus of the fifth embodiment is suitable for a case of employing so-called "zero drag calipers" for positively ensuring relatively large clearances between brake pads on pistons of WCYs 5, 6, 7, 8 and brake discs or brake drums, respectively while the brake system is inoperative, thereby preventing "brake drag". That is, in case where the brake pedal apparatus of the fifth embodiment is adopted to a brake system employing the "zero drag calipers", the pedal leverage is set to the smaller ratio when the pedal stroke is shorter than the threshold value in an initial stage of depressing the brake pedal as shown in FIG. 9(b). As a result of this, the stroke of the input shaft 3a is increased relative to the same pedal stroke by comparison with the conventional one. Though stroke loss produced at the WCYs should be increased due to the aforementioned large clearances, the stroke loss can be cancelled by increase in the stroke of the input shaft 3a mentioned above. Therefore, the stroke loss at the WCYs can be securely cancelled with a small pedal stroke.

When the pedal stroke reaches the threshold value and the stroke loss at the WCYs is completely cancelled, the pedal leverage is changed to the larger ratio which is larger than the conventional pedal leverage as shown in FIG. 9(b). Therefore, large MCY pressure can be obtained by relatively small pedaling force. Therefore, larger braking force can be obtained by small pedaling force in comparison with the conventional one, thereby securing the normal braking operation.

Employment of the brake pedal apparatus of the fifth embodiment enables the pedal leverage to be set to the smaller ratio when larger input of the input shaft is not necessary but somewhat longer stroke of the input is necessary for canceling the stroke loss at the WCYs, and enables the pedal leverage to be set to the larger ratio when somewhat larger input of the input shaft is necessary but longer stroke of the input shaft is not necessary after the stroke loss is cancelled. In this case, the pedal stroke—MCY pressure characteristic is indicated in FIG. 9(c) in which the increase in the MCY pressure is not so large relative to the increase in the pedal stroke before the stroke loss is cancelled, the increase in the MCY pressure is significantly large relative to the slight increase in the pedal stroke after the stroke loss is cancelled.

Even with large stroke loss at the WCYs, the same pedal stroke as the conventional one can be obtained, thereby enabling the employment of the "zero drag caliper". This arrangement can prevent the aforementioned "brake drag", thereby reducing power loss of an engine due to the "brake drag" and thus improving the fuel consumption.

The other components, other actions, and other works and effects of the fifth embodiment are the same as those of the first embodiment.

Figure 10:
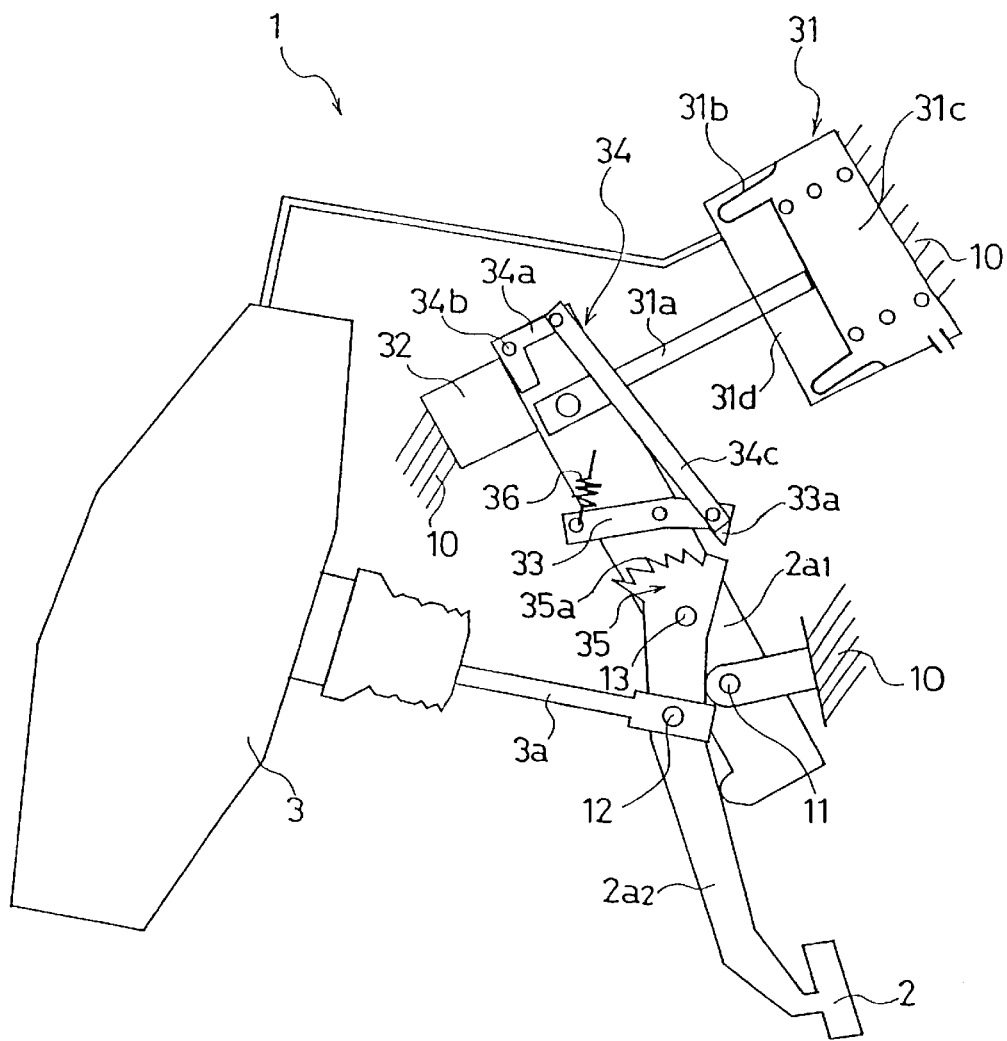
FIG. 10 is an illustration schematically showing a brake pedal apparatus of a sixth embodiment according to the present invention.

FIG. 10 is an illustration schematically showing a brake pedal apparatus of the sixth embodiment according to the present invention.

In the brake pedal apparatus of the sixth embodiment, the pedal leverage is set to the larger ratio in the event of failure of the amplifying action of the booster 3 similarly to the aforementioned second embodiment. However, in this case, the pedal leverage is set to the larger ratio in the event of failure of the pressure sources of the booster 3.

That is, as shown in FIG. 10, the receiving portion 14, the engaging means 15, and the spring 16 employed in the first and second embodiments are not employed in the brake pedal apparatus of the sixth embodiment. Instead of those, an output shaft 31a of an actuator 31 which is controlled by pressure of the pressure source of the booster 3 is connected to the upper end portion of the first lever member $2a_1$. In this case, the actuator 31 is directly or indirectly fixed to a suitable position of a vehicle body 10. The booster 3 is a vacuum booster which is conventionally known so that the pressure source of the booster 3 is a negative pressure source, not shown, and the pressure is negative pressure. Then, the inside of the actuator 31 is air-tightly divided by a diaphragm piston 31b into a high-pressure chamber 31c which communicates with atmosphere and a low-pressure chamber 31d which is connected with the negative pressure source (not shown) through the vacuum booster 3.

When the negative pressure source is normal, negative pressure is introduced into the low-pressure chamber 31d so that the diaphragm piston 31b is actuated by pressure difference between the chambers 31c and 31d, whereby the actuator 31 outputs via the output shaft 31a. By the output of the output shaft 31a, the upper end portion of the first lever member $2a_1$ is pressed against a stopper 32 of the vehicle body 10, thereby preventing the pivotal movement of the first lever member $2a_1$. In the event of failure of the negative pressure source, the introduction of negative pressure into the low-pressure chamber 31d is stopped so that pressure difference between the chambers 31c and 31d is eliminated. Therefore, the diaphragm piston 31b is not actuated so that the actuator 31 does not output and the upper end portion of the first lever member $2a_1$ is not pressed by the output shaft 31a, thereby allowing free pivotal movement of the first lever member $2a_1$.

Further, an engaging member 33 having a pawl 33a is pivotally disposed to an upper portion of the first lever member $2a_1$. The engaging member 33 is connected to the first lever member $2a_1$ via a linkage 34. The linkage 34 has a L-like member 34a. The L-like member 34a is pivotally supported at its corner by a pivot pin 34b to the first lever member $2a_1$. An end of a side of the L-like member 34a is pivotally connected to the engaging member 33 via a link rod 34c. Furthermore, a gear portion 35 having a predetermined number of external teeth 35a is formed at the upper end of the second lever member $2a_2$.

As the first lever member $2a_1$ pivots in the clockwise direction in FIG. 10, the engaging member 33 moves with the pivotal movement of the first lever member $2a_1$ to pivot via the linkage 34 in such a direction as to mesh the pawl 33a with one of the teeth 35a of the gear portion 35. The actuator 31 composes the pivotal movement control means of the present invention and the engaging member 33, the linkage 34, and the gear portion 35 compose the coupling means of the present invention. It should be noted that a numeral 36 designates a spring which always biases the engaging member 33 in such a direction as to mesh the pawl to the teeth 35a.

The other components of the brake pedal apparatus of the sixth embodiment are the same as those of the first embodiment.

In the brake pedal apparatus of the sixth embodiment having the aforementioned structure, when the negative pressure source of the vacuum booster 3 is normal, the actuator outputs as mentioned above to fix the first lever member $2a_1$ not to allow its pivotal movement. When the brake pedal 2 is depressed, only the second lever member $2a_2$ pivots about the second pivot pin 13 so that the pedal leverage is set to be a smaller ratio. Accordingly, the service brake is operated with amplifying action of the vacuum booster 3 as the conventional manner.

In the event of failure of the negative pressure source of the vacuum booster 3, the actuator does not output as mentioned above so that the first lever member $2a_1$ is allowed to pivot about the first pivot pin 11. When the brake pedal 2 is depressed, the second lever member $2a_2$ pivots in the clockwise direction in FIG. 10 and the first lever member $2a_1$ also starts to pivot in the same direction via the second pivot pin 13 by the pivotal movement of the second lever member $2a_2$. Then, the engaging member 33 pivots via the linkage 34 by the pivotal movement of the first lever member $2a_1$, whereby the pawl 33a meshes one of the teeth 35a of the second lever member $2a_2$.

Then, the first and second lever members $2a_1$, $2a_2$ pivot together about the first pivot pin 11 in the clockwise direction. At this point, the pedal leverage is set to be larger than that when the negative pressure source is normal as stated above. Therefore, the pedal leverage in the event of failure of the negative pressure source can be set to be larger than the ratio when the negative pressure source is normal (that is the same as the lever ratio of the conventional brake pedal which is impossible to be changed), thereby obtaining large braking force. Therefore, even when the amplifying action of the vacuum booster 3 fails due to the failure of the negative pressure source, predetermined braking force can be obtained, thereby ensuring the braking operation.

The other actions and other works and effects of the sixth embodiment are the same as those of the first embodiment.

Though the booster 3 employed in any of the brake pedal apparatuses of the sixth through the ninth embodiments embodiment is a vacuum booster, the booster 3 may be a booster of another type, for example, using fluid pressure or air pressure.

Figure 11:
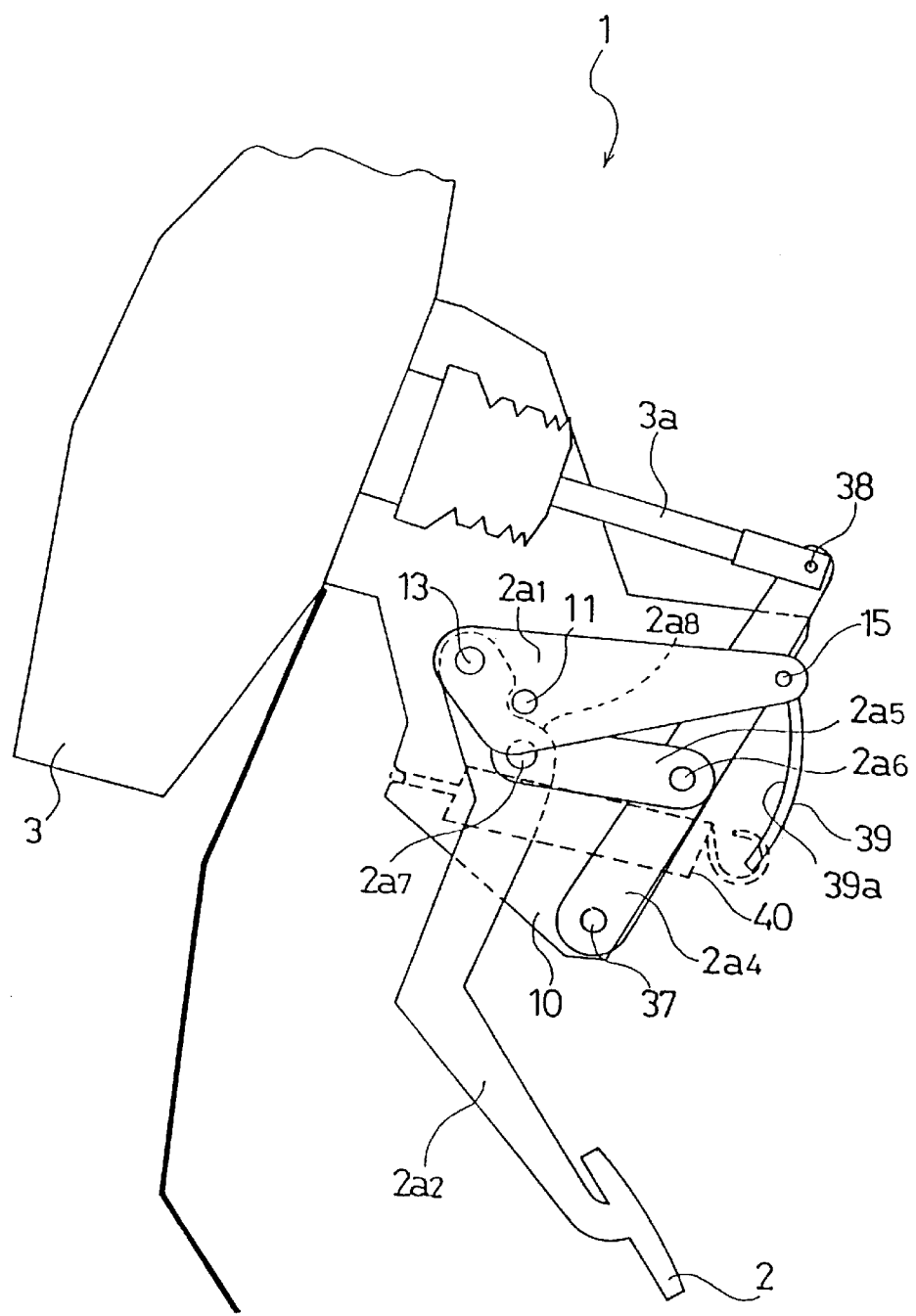
FIG. 11 is an illustration schematically showing a brake pedal apparatus of a seventh embodiment of the present invention in its inoperative state.

FIG. 11 is an illustration schematically showing a brake pedal apparatus of the seventh embodiment of the present invention in its inoperative state and FIGS. 12(a), 12(b) are illustrations schematically showing the brake pedal apparatus of the seventh embodiment in its operative state, wherein FIG. 12(a) is an illustration similar to FIG. 11 and FIG. 12(b) is a partially enlarged view of FIG. 12(a).

Though the input shaft 3a of the booster 3 is directly connected to the second lever member $2a_2$ by the connection pin 12 in such a manner that the second lever member $2a_2$ can relatively pivot about the connection pin 12 in the brake system of the first embodiment shown in FIG. 1, the input shaft 3a is not directly connected to the second lever member $2a_2$ and is connected to an end of a third lever member $2a_4$ by a connection pin 38. The other end of the third lever member $2a_4$ is pivotally connected to the vehicle body 10 by a pin 37. A middle portion of the third lever member $2a_4$ and a middle portion of the second lever member $2a_2$ are connected by a fourth lever member $2a_5$ and two pins $2a_6$, $2a_7$ in such a manner that the third lever member $2a_4$ and the second lever member $2a_2$ can pivot relative to each other. The third and fourth lever members $2a_4$, $2a_5$ compose the third lever member of the present invention. The third lever member of the present invention may be composed of one or more of lever member of which number is arbitrary.

The first lever member $2a_1$ of the seventh embodiment is provided with an engaging means 15 which takes the form of a pin, instead of the steel ball employed in the first embodiment, and is not provided with the spring 16 for biasing the engaging means 15 which is employed in the first embodiment. Further, instead of the curved surface 10a for guiding the engaging means 15 which is formed in the vehicle body 10 in the first embodiment, an arc member 39 of a ridged body having a curved surface 39a is pivotally supported at its one end to the vehicle body 10 in the seventh embodiment. A spring 40 is disposed between the other end of the arc member 39 and the vehicle body 10 so that the arc member 39 is always biased in the clockwise direction in FIG. 11 by the spring force of the spring 40. As clearly shown in FIGS. 12(a) and 12(b), instead of the receiving portion 14 of the first embodiment, the arc member 39 is provided with a receiving portion 41 composed of a V-like groove which the engaging means 15 can engage. The engaging means 15, the receiving portion 41 of the arc member 39, and the spring 40 compose the pivotal movement control means of the present invention.

Moreover, the first lever member $2a_1$ is not provided with the projection-like stopper portion $2a_3$ of the first embodiment. Instead of this, a stopper portion $2a_8$ composed of a concave portion which can engage the first pivot pin 11 is formed in a portion of the second lever member $2a_2$ at the middle between the brake pedal 2 and the second pivot pin 13. The stopper portion $2a_8$ composes the coupling means which comes in contact with the first pivot pin 11 to move the first and second lever members $2a_1$, $2a_2$ together when the engaging means 15 comes off the receiving portion 41 just like the stopper portion $2a_3$ of the first embodiment.

The other components of the seventh embodiment are the same as those of the first embodiment.

In the brake pedal apparatus of the seventh embodiment having the aforementioned structure, in the inoperative state, the engaging means 15 is maintained in the engaged state with the receiving portion 41 because of the spring force of the spring 40 and the stopper portion $2a_8$ is in contact with the first pivot pin 11 as shown in FIG. 11.

As the brake pedal 2 is depressed normally in this inoperative state, the pedaling force $F_p$ does not reach the threshold value $F_{p0}$ so that the engaging means 15 is maintained in the engaged state with the receiving portion 41. In this state, the first lever member $2a_1$ does not pivot and the second lever member $2a_2$ pivots about the second pivot pin 13 in the clockwise direction in FIG. 11 similarly to the first embodiment. Then, the third lever member $2a_4$ pivots about the pin 37 in the counterclockwise direction through the fourth lever member $2a_5$ to move the input shaft 3a forward, thereby actuating the booster 3 and thus operating the service brake. As the brake pedal 2 is released, similarly to the first embodiment, the respective lever members pivot in the opposite directions to return the brake pedal apparatus in the inoperative state shown in FIG. 11, thereby canceling the operation of the service brake.

As the pedaling force $F_p$ exceeds the pedaling force $F_{pa}$ as the threshold value $F_{p0}$ by depression of the brake pedal 2, for example, for emergency braking which is stronger than that for the normal braking, the engaging means 15 comes off the receiving portion 41 similarly to the aforementioned first embodiment. Then, the first lever member $2a_1$ pivots about the first pivot pin 11 in the clockwise direction in FIG. 11 and the second lever member $2a_2$ pivots about the connection pin $2a_7$ in the same direction. At this point, since the amount of pivotal movement of the first lever member $2a_1$ is greater than the amount of pivotal movement of the second lever member $2a_2$, the stopper portion $2a_8$ immediately comes in contact with the first pivot pin 11. After that, the first and second lever members $2a_1$, $2a_2$ pivot together about the first pivot pin 11. Therefore, the pedal leverage is changed to the larger ratio. That is, as the pedaling force $F_p$ increases, the MCY pressure is increased by a booster ratio larger than the conventional booster ratio, thus having a so-called reversed two-stage servo characteristic.

In addition, as the pedaling force $F_p$ exceeds the pedaling force $F_{pa}$ as the threshold value $F_{p0}$ even in the event of failure of the amplifying action of the booster 3, the pedal leverage is changed to the larger ratio in the same manner. Therefore, similarly to the case shown in FIG. 3(d), the MCY pressure is linearly increased by the increased ratio significantly larger than the conventional ratio, thus assisting the driver's operational force.

The pedal stroke—pedal leverage characteristic of the brake pedal apparatus of the seventh embodiment when the engaging means 15 engages the receiving portion 41 is indicated in FIG. 13(a), in which the pedal leverage slightly decreases and then slightly increases relative to the increase in the pedal stroke and, on the whole, is substantially constant. The characteristic when the engaging means 15 comes off the receiving portion 41 is indicated in FIG. 13(b), in which the pedal leverage increases relative to the increase in the pedal stroke.

The brake pedal apparatus of the seventh embodiment has increased degree of freedom in arrangement of the apparatus, as compared to the aforementioned embodiments, because two lever members i.e. the third and fourth lever members $2a_4$, $2a_5$ are provided. For example, the brake pedal apparatus can be disposed below the input shaft 3a of the booster 3 as shown in FIG. 11. This improves the degree of freedom in arrangement of the brake pedal apparatus and can shorten the entire length of the assembly of the brake pedal apparatus, the booster 3, and the master cylinder 4.

The other actions and other works and effects of the seventh embodiment are the same as those of the first embodiment. It should be understood that though the seventh embodiment is described in comparison to the first embodiment, this embodiment can be adopted to any of the aforementioned embodiments.

Figure 14:
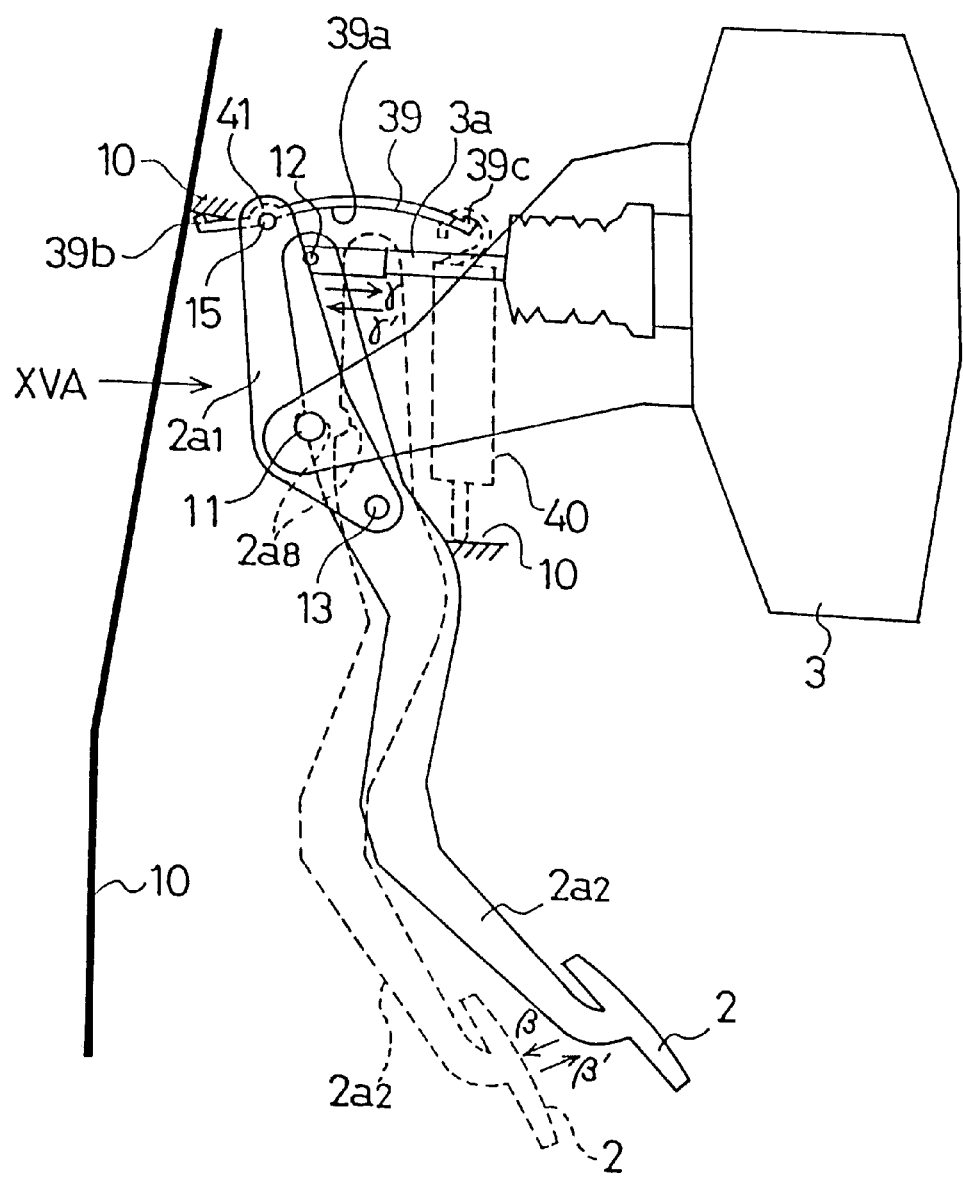
FIG. 14 is an illustration schematically showing a brake pedal apparatus of an eighth embodiment of the present invention.
Figure 15:
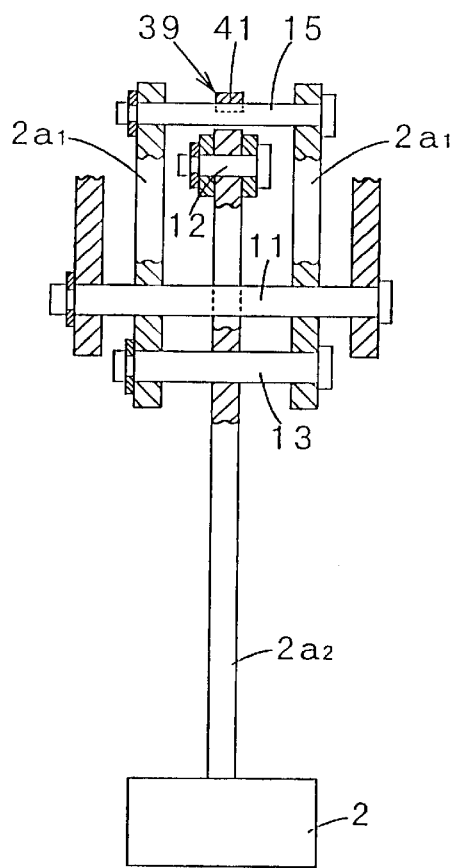
FIG. 15(a) is a schematic illustration partially showing the eighth embodiment as a view taken from XVA in FIG. 14
FIG. 15(b) is a graph indicating the pedal leverage of the eighth embodiment.

FIG. 14 is an illustration schematically showing a brake pedal apparatus of an eighth embodiment of the present invention, FIG. 15(a) is a schematic illustration partially showing the eighth embodiment as a view taken from XVA in FIG. 14, and FIG. 15(b) is a graph indicating the pedal leverage of the eighth embodiment.

Though the connection pin 12 is positioned on the brake pedal side with respect to the second pivot pin 13 in the brake pedal apparatus of the first embodiment, the second pivot pin 13 is positioned on the brake pedal side with respect to the connection pin 12 in the brake pedal apparatus of the eighth embodiment as shown in FIG. 14 and FIG. 15(a). That is, middle portions of first lever members $2a_1$ are connected to a vehicle body (for example, a toe board) 10 by a first pivot pin 11 in such a manner that the first lever members $2a_1$ can pivot about the first pivot pin 11, and a middle portion of a second lever member $2a_2$ is connected to one ends of the first lever members $2a_1$ positioned on the brake pedal 2 side with respect to the first pivot pin 11 by a second pivot pin 13 in such a manner that the second lever member $2a_2$ can pivot about the second pivot pin 13. The second lever member $2a_2$ has one end with the brake pedal 2 and the other opposite end to which an input shaft 3a of a booster 3 is pivotally connected via a connection pin 12.

Figure 12:
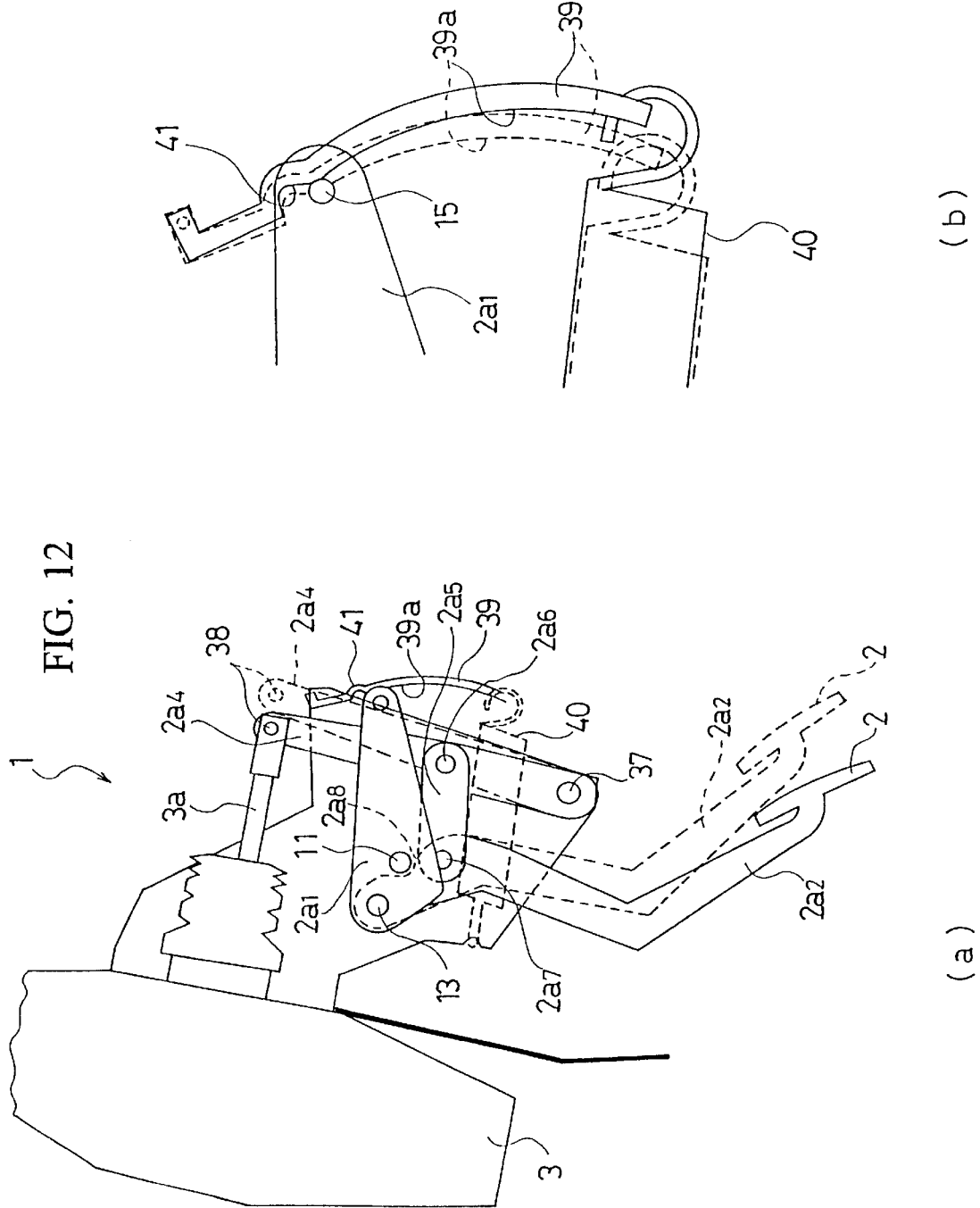

Similarly to the seventh embodiment shown in FIG. 11 and FIG. 12, the first lever members $2a_1$ of the eighth embodiment are provided with engaging means 15 which takes the form of a pin, instead of the steel ball employed in the first embodiment, and is not provided with the spring 16 for biasing the engaging means 15 which is employed in the first embodiment. Further, instead of the curved surface 10a for guiding the engaging means 15 which is formed in the vehicle body 10 in the first embodiment, an arc member 39 of a ridged body having a curved surface 39a is positioned above the input shaft 3a of the booster 3 and is pivotally supported at its one end 39b to the vehicle body 10 in the eighth embodiment. A spring 40 is disposed between the other end 39c of the arc member 39 and the vehicle body 10 so that the arc member 39 is always biased in the clockwise direction in FIG. 14 by the spring force of the spring 40.

Instead of the receiving portion 14 of the first embodiment, the arc member 39 is provided with a receiving portion 41 composed of an arc groove which the engaging means 15 can engage. The engaging means 15, the receiving portion 41 of the arc member 39, and the spring 40 compose the pivotal movement control means of the present invention.

Moreover, the first lever members $2a_1$ are not provided with the projection-like stopper portion $2a_3$ of the first embodiment. Instead of this, a stopper portion $2a_8$ composed of a concave portion which can engage the first pivot pin 11 is formed in a portion of the second lever member $2a_2$ at the middle between the connection pin 12 and the second pivot pin 13. The stopper portion $2a_8$ composes the coupling means which comes in contact with the first pivot pin 11 to pivotally move the first and second lever members $2a_1$, $2a_2$ together when the engaging means 15 comes off the receiving portion 41 just like the stopper portion $2a_3$ of the first embodiment.

The other components of the eighth embodiment are the same as those of the first embodiment.

In the brake pedal apparatus of the eighth embodiment having the aforementioned structure, in the inoperative state, the engaging means 15 is maintained in the engaged state with the receiving portion 41 because of the spring force of the spring 40 and the stopper portion $2a_8$ is in contact with the first pivot pin 11 as shown by a solid line in FIG. 14 similarly to the aforementioned seventh embodiment.

As the brake pedal 2 is depressed normally in this inoperative state, the pedaling force $F_p$ does not reach the threshold value $F_{p0}$ so that the engaging means 15 is maintained in the engaged state with the receiving portion 41. In this state, the first lever members $2a_1$ do not pivot and the second lever member $2a_2$ pivots about the second pivot pin 13 in the clockwise direction in FIG. 14 similarly to the first embodiment. Then, the input shaft 3a moves forward (in a direction toward a control value of the booster 3, i.e. to the right in FIG. 14) to actuate the booster 3, thus operating the service brake. As the brake pedal 2 is released, similarly to the first embodiment, the respective lever members pivot in the opposite directions to return the brake pedal apparatus in the inoperative state as shown by a solid line in FIG. 14, thereby canceling the operation of the service brake.

During this operation, the pedal leverage is (L2−L1)/L1, wherein L1 is a distance between the connection pin 12 and the second pivot pin 13 similarly to the aforementioned embodiments, and L2 is a distance between the connection pin 12 and the center of the brake pedal 2. Though the operating directions β, β' of the brake pedal 2 are equal to the stroke directions of the input shaft 3a of the booster 3 in the first embodiment, the operating directions β, β' of the brake pedal 2 are opposite to the stroke directions γ, γ' of the input shaft 3a of the booster 3 in the eighth embodiment.

As the pedaling force $F_p$ exceeds the pedaling force $F_{pa}$ as the threshold value $F_{p0}$ by depression of the brake pedal 2, for example, in case of emergency braking or in the event of failure of the amplifying action of the booster which is stronger than that for the normal braking, the engaging means 15 comes off the receiving portion 41 similarly to the aforementioned first embodiment. Then, the first lever members $2a_1$ pivot about the first pivot pin 11 in the clockwise direction in FIG. 14. Since the stopper portion $2a_8$ is in contact with the first pivot pin 11, the second lever member $2a_2$ pivots about the first pivot pin 11. At this point, even when the second lever member $2a_2$ moves to slightly separate from the first pivot pin 11 because the second lever member $2a_2$ pivots about the second pivot pin 13 due to the depression of the brake pedal 2 prior to the engaging means 15 comes off the receiving portion 41, the first lever members $2a_1$ pivot about the first pivot pin 11 so that the stopper portion $2a_8$ immediately comes in contact with the first pivot pin 11. Therefore, actually, the second lever members $2a_2$ pivots about the first pivot pin 11.

In this manner, the pedal leverage of the lever 2a of the brake pedal 2 is changed. The pedal leverage at this point is (L2−L3)/L3, wherein L3 is a distance between the connection pin 12 and the first pivot pin 11 similarly to the aforementioned embodiments. Since L3<L1, the pedal leverage in the event of emergency or failure of the amplifying action of the booster is larger than that in the normal state. Therefore, similarly to the case shown in FIG. 3(d), the MCY pressure is linearly increased by the increased ratio significantly larger than the conventional ratio, thus assisting the driver's operational force.

The pedal stroke—pedal leverage characteristic of the brake pedal apparatus of the eighth embodiment is flat as indicated in FIG. 15(b) in which the pedal leverage is constant both in case of the smaller ratio for the normal operation and in case of the larger ratio for emergency braking or operation in the event of failure of the amplifying action.

In the brake pedal apparatus of the eighth embodiment, since the operating directions β, β' of the brake pedal are opposite to the stroke directions γ, γ' of the input shaft 3a of the booster 3, respectively, the booster 3 and the MCY 4 are arranged on the driver side. Accordingly, such arrangement of the booster 3 and the MCY 4 is suitable for a vehicle of a type having a relatively small space in front of a driver's seat, for example, a minivan.

In the brake apparatus of the eighth embodiment, the number of lever members is reduced as compared to the seventh embodiment, thus reducing the number of parts and making the structure simple and compact.

The other actions and other works and effects of the eighth embodiment are the same as those of the first embodiment. It should be understood that though the eighth embodiment is described in comparison to the first embodiment and the seventh embodiment, this embodiment can be adopted to any of the aforementioned embodiments.

Figure 16:
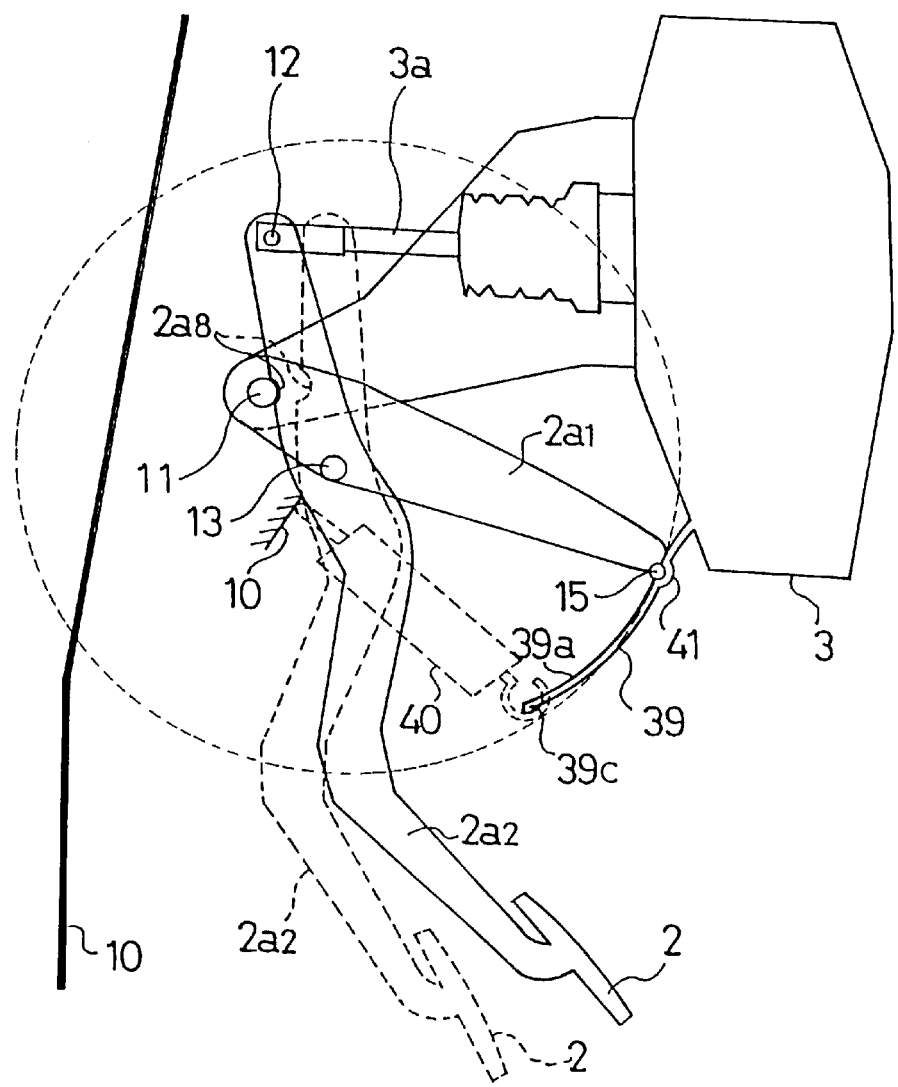
FIG. 16 is an illustration schematically showing a brake pedal apparatus of a ninth embodiment of the present invention.
Figure 17:
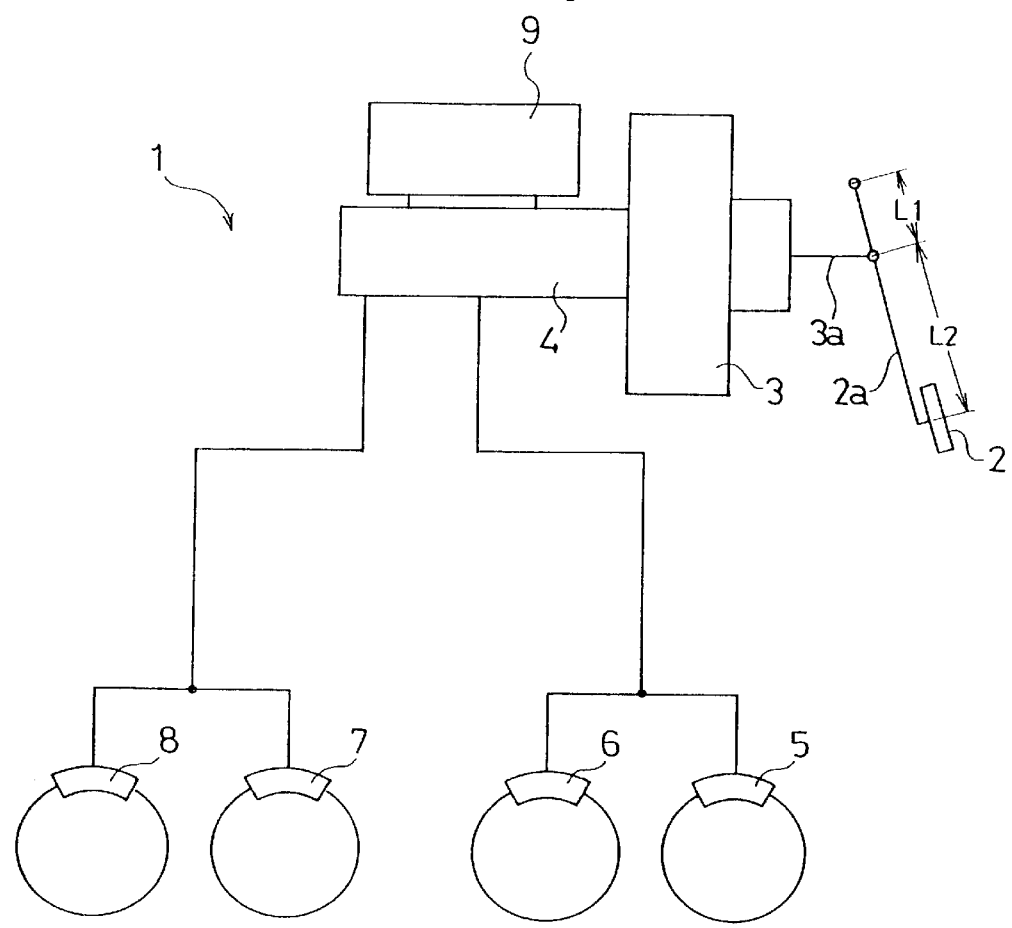
FIG. 17 is an illustration schematically showing the basic structure of a typical conventional brake system with a brake pedal.

FIG. 16 is an illustration schematically showing a brake pedal apparatus of a ninth embodiment of the present invention.

Though the arc member 39 is disposed above the input shaft 3a of the booster 3 in the eighth embodiment, the arc member 39 is disposed below the input shaft 3a of the booster 3 in the brake pedal apparatus of the ninth embodiment as shown in FIG. 16.

The other components of the ninth embodiment are the same as those of the eighth embodiment.

According to the brake pedal apparatus of the ninth embodiment having the aforementioned structure, when a predetermined space can not be ensured above the input shaft 3a of the booster 3 not to allow the arc member 39 to be arranged above the input shaft 3a like the eighth embodiment, the arc member 39 can be effectively arranged to use a dead space below the input shaft 3a of the booster 3 from the viewpoint of efficient use of space.

The other actions and other works and effects of the ninth embodiment are the same as those of the eighth embodiment.

Though any of the aforementioned embodiments employs the booster 3, it is not indispensable to employ the booster 3. The input shaft (for operating the piston of the master cylinder 4) of the master cylinder 4 may be directly connected to the second lever member $2a_2$.

As apparent from the above description, according to the brake pedal apparatus of the present invention, the second lever member can be controlled to switch its pivot by the pivotal movement control means by preventing the pivotal movement of the first lever member(s) when the predetermined condition is not satisfied and allowing the first lever member(s) to pivot together with the second lever member when the predetermined condition is satisfied, thereby easily changing the pedal leverage. Therefore, the aforementioned problems (1) through (5) can be effectively solved by variously setting the predetermined condition.

According to the present invention, the input shaft of the booster or the input shaft of the master cylinder is pivotally connected to the second lever member at a position between the first pivot pin and the brake pedal. Therefore, since the operating directions of the brake pedal are equal to the stroke directions of the input shaft of the booster or the input shaft of the master cylinder, respectively, the booster or the master cylinder is arranged on the vehicle-front side, i.e. the side opposite to the driver, with respect to the first pivot pin. Accordingly, the brake pedal apparatus can be effectively installed in a vehicle of a type having a relatively larger space in front of a driver's seat, for example, a vehicle of a bonnet type from the viewpoint of efficient use of space.

Moreover, according to the present invention, the input shaft of the booster or the input shaft of the master cylinder is pivotally connected to the second lever member at a position opposite to the brake pedal with respect to the first pivot point. Therefore, since the operating directions of the brake pedal are opposite to the stroke directions of the input shaft of the booster or the input shaft of the master cylinder, respectively, the booster is arranged on the vehicle-rear side, i.e. the driver side, with respect to the first pivot pin. Accordingly, the brake pedal apparatus can be effectively installed in a vehicle of a type having a relatively small space in front of a driver's seat, for example, a minivan from the viewpoint of efficient use of space.

Particularly according to the present invention, the second lever member and the input shaft of the booster or the master cylinder are connected to each other via the third lever member, thereby increasing the degree of freedom in arrangement of the brake pedal apparatus. Accordingly, the brake pedal apparatus can be disposed below the input shaft of the booster. In this manner, the degree of freedom in arrangement of the pedal apparatus can be improved and the entire length of the assembly of the brake pedal apparatus, the booster and/or the master cylinder can be shortened.

According to the present invention, the pivotal movement control means is composed of the engaging means disposed on the first lever member, the receiving portion disposed on the vehicle body, the engagement control means for controlling the engagement between the engaging means and the receiving portion so that the pedal apparatus is structured simple.

Further according to the present invention, when the threshold value for the pedaling force is set to be lower than that at the full load point of the booster, the pedal leverage is set to the smaller ratio during the normal braking. Therefore, the pedal stroke can be shortened, thereby improving the pedaling feeling. In this case, since the brake system has the reversed two-stage servo characteristic, the BA control can be conducted in case of operation for emergency braking because of this reversed two-stage servo characteristic, thereby securing the emergency braking operation. In case of failure of the amplifying action of the booster, the pedal leverage can be changed to be larger by pedaling force exceeding the threshold value. Therefore, the driver's operational force can be assisted to have increased braking force so that the brake is operated with predetermined braking force even in case of failure of the amplifying action.

Furthermore, even after the full load point of the booster, the braking force can be assisted. Also when the threshold value for the pedaling force is set to be larger than that at the full load point, the braking force can be assisted even after the full load point in the same manner.

According to the present invention, the pedal leverage is changed based on the pedal stroke in addition to the pedaling force, thereby more precisely and effectively conducting the change in pedal leverage.

According to the present invention, since the pedal leverage is changed based on the pedaling speed, braking force required for the normal braking can be obtained during the normal braking, while braking force can be obtained with a small pedal stroke when the pedaling speed is higher than that for the normal braking. In particular, applying the brake pedal apparatus to the BA control enables a driver such as an inexpert driver, who can depress only the same level as the normal braking, to conduct emergency braking operation without fail.

Further according to the present invention, when the pedal is moved backward from its inoperative position, the engaging means comes off the receiving portion by the engagement control means, thereby preventing the backward movement of the pedal from its inoperative position and preventing the pedal from colliding with the driver.

Furthermore, according to the present invention, since the pedal leverage is changed based on the pedal stroke, long stroke of the input shaft can be obtained with small pedal stroke in the initial stage of depressing the pedal when the pedal leverage is set to the smaller ratio, and large output of the input shaft can be obtained with small pedaling force when the pedal stroke is set to the larger ratio. Therefore, employment of the brake pedal apparatus enables the pedal leverage to be set to the smaller ratio when larger input of the input shaft is not necessary but somewhat longer stroke of the input is necessary for canceling the stroke loss at the WCYs, and enables the pedal leverage to be set to the larger ratio when somewhat larger input of the input shaft is necessary but longer stroke of the input shaft is not necessary after the stroke loss is cancelled. In this manner, even with large stroke loss at the WCYs, the same pedal stroke as the conventional one can be obtained, thereby enabling the employment of the "zero drag caliper". This arrangement can prevent the aforementioned "brake drag", thereby reducing power loss of an engine due to the "brake drag" and thus improving the fuel consumption.

Moreover, according to the present invention, the normal braking operation can be conducted by normally depressing the pedal when the power source is normal. In the event of failure of the power source, the pedal leverage is set to be larger than the ratio for the normal braking, thus obtaining large braking force. Therefore, even when the amplifying action of the vacuum booster fails due to the failure of the power source, predetermined braking force can be obtained, thereby ensuring the braking operation.

I claim:
1. A brake pedal apparatus for a brake device comprising:
  an input shaft for the brake device;
  first and second pivot pins;
  a first lever member having a middle portion pivotally supported to a vehicle body by the first pivot pin;
  a second lever member having one end with a pedal member and the other end pivotally connected to one end of said first lever member by the second pivot pin, said second lever member being operationally connected to the input shaft for the brake device;
  pivotal movement control means connected to the first lever member for controlling a pivotal movement of said first lever member in such a manner as to prevent the pivotal movement of said first lever member when a predetermined condition is not satisfied and to allow the pivotal movement of said first lever member when the predetermined condition is satisfied, said pivotal movement control means including a receiving portion disposed at a position facing the one end of said first lever member; engaging means disposed on the other end of said first lever member and capable of engaging said receiving portion; and engagement control means for controlling an engagement between said engaging means and said receiving portion in such a manner as to disengage said engaging means by the satisfaction of said predetermined condition, which engages said receiving portion to prevent the pivotal movement of said first lever member, from said receiving portion to allow the pivotal movement of said first lever member; and
  coupling means for coupling said first and second lever members, said coupling means, when the pivotal movement of said first lever member is allowed, rotating the second lever member together with the first lever member around the first pivot pin by pushing the pedal member to actuate the input shaft to thereby change a pedal ratio of the pedal member.
2. A brake pedal apparatus as claimed in claim 1, wherein the other end of said second lever member positioned opposite to said pedal member is pivotally connected to the one end of said first lever member positioned opposite to said pedal member, and the input shaft is pivotally connected to the second lever member at a position on a pedal member side relative to said first pivot pin.
3. A brake pedal apparatus as claimed in claim 1, wherein said second lever member has a middle portion engaging a pedal member side of said first lever member, and the input shaft is positioned on a side opposite to said pedal member relative to said first pivot pin.
4. A brake pedal apparatus as claimed in any one of claims 1 through 3, further comprising a third lever member for pivotally connecting said second lever member and the input shaft.
5. A brake pedal apparatus as claimed in claim 1, wherein said predetermined condition is whether a pedaling force exceeds a preset threshold value or not, and said engagement control means controls the engagement in such a manner as to maintain said engaging means in an engaged state with said receiving portion when said pedaling force is smaller than the preset threshold value and to disengage said engaging means from said receiving portion when said pedaling force exceeds said preset threshold value.
6. A brake pedal apparatus as claimed in claim 1, wherein said predetermined condition is whether a pedaling force exceeds a first preset threshold value or not and whether a pedal stroke exceeds a second preset threshold value or not, and said engagement control means controls the engagement in such a manner as to disengage said engaging means from said receiving portion only when said pedaling force exceeds said first threshold value and said pedal stroke is smaller than said second threshold value.
7. A brake pedal apparatus as claimed in claim 1, wherein said predetermined condition is whether a pedaling speed exceeds a preset threshold value or not, and said engagement control means controls the engagement in such a manner as to maintain said engaging means in an engaged state with said receiving portion when said pedaling speed exceeds the preset threshold value and to disengage said engaging means from said receiving portion when said pedaling speed is lower than said preset threshold value.
8. A brake pedal apparatus as claimed in claim 1, wherein said predetermined condition is whether said pedal member is moved backward from its inoperative position or not, and said engagement control means controls the engagement in such a manner as to disengage said engaging means from said receiving portion when said pedal member is moved backward from its inoperative position.
9. A brake pedal apparatus as claimed in claim 1, wherein said predetermined condition is whether a pedal stroke exceeds a preset threshold value or not, and said engagement control means controls the engagement in such a manner as to maintain said engaging means in an engaged state with said receiving portion when said pedal stroke is shorter than the preset threshold value and to disengage said engaging means from said receiving portion when said pedal stroke exceeds said preset threshold value.
10. A brake pedal apparatus as claimed in any one of claims 1 through 3, wherein said predetermined condition is whether a power source of said brake device is normal or not, and said pivotal movement control means controls the pivotal movement of said first lever member in such a manner as to prevent the pivotal movement of said first lever member when said power source is normal and to allow the pivotal movement of said first lever member when said power source fails.
11. A brake pedal apparatus as claimed in claim 1, wherein said coupling means has a first pedal ratio for pushing the pedal member when the pivotal movement of the first lever member is allowed, and a second pedal ratio different from the first pedal ratio when the pivotal movement of the first lever member is not allowed.

12. A brake pedal apparatus as claimed in claim 11, wherein said second lever member is operationally connected to the input shaft without movement of the first lever member when the pivotal movement of first lever member is not allowed.

* * * * *

UNITED STATES PATENT AND TRADEMARK OFFICE
CERTIFICATE OF CORRECTION

PATENT NO. : 6,666,105 B2
DATED : December 23, 2003
INVENTOR(S) : Yuji Wachi

It is certified that error appears in the above-identified patent and that said Letters Patent is hereby corrected as shown below:

Column 29,
Line 46, change "other" to -- one --.

Signed and Sealed this

Ninth Day of March, 2004

JON W. DUDAS
*Acting Director of the United States Patent and Trademark Office*